(12) United States Patent
Osada

(10) Patent No.: US 10,771,645 B2
(45) Date of Patent: Sep. 8, 2020

(54) PRINTING CONTROL APPARATUS METHOD FOR CONTROLLING PRINTING CONTROL APPARATUS AND STORAGE MEDIUM

(71) Applicant: CANON KABUSHIKI KAISHA, Tokyo (JP)

(72) Inventor: Tomoaki Osada, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/587,859

(22) Filed: Sep. 30, 2019

(65) Prior Publication Data

US 2020/0028984 A1 Jan. 23, 2020

Related U.S. Application Data

(63) Continuation of application No. 15/971,699, filed on May 4, 2018, now Pat. No. 10,469,687, which is a
(Continued)

(51) Int. Cl.
*H04N 1/00* (2006.01)
*H04N 1/21* (2006.01)
(Continued)

(52) U.S. Cl.
CPC ....... *H04N 1/00745* (2013.01); *G03G 15/607* (2013.01); *H04N 1/0057* (2013.01);
(Continued)

(58) Field of Classification Search
None
See application file for complete search history.

(56) References Cited

U.S. PATENT DOCUMENTS 5,515,140 A * 5/1996 Atsumi .............. G03G 15/0105
399/127
5,912,747 A * 6/1999 Murakami ......... H04N 1/00708
358/474
(Continued)

FOREIGN PATENT DOCUMENTS

JP 09331418 A * 12/1997
JP 2002314763 A * 10/2002
(Continued)

*Primary Examiner* — Ted W Barnes
(74) *Attorney, Agent, or Firm* — Canon U.S.A., Inc. IP Division

(57) ABSTRACT

A printing control apparatus includes a conveying unit that conveys a document to a reading unit, a detection unit that detects a size of the document before it begins to be conveyed, a detection unit that detects the size of the document after the document begins to be conveyed, and a control unit that performs a copy job using the reading unit and printing unit based on the size of the document detected before it is conveyed in a case where the printing unit starts to print the image data before the reading unit finishes generating image data for one page and performs a copy job based on the size of the document detected after it begins to be conveyed in a case where the printing unit starts to print the image data after the reading unit finishes generating image data for at least one page.

20 Claims, 12 Drawing Sheets

Related U.S. Application Data continuation of application No. 14/964,415, filed on Dec. 9, 2015, now Pat. No. 9,992,366.

(51) Int. Cl.
*H04N 1/32* (2006.01)
*G03G 15/00* (2006.01)

(52) U.S. Cl.
CPC ..... *H04N 1/00204* (2013.01); *H04N 1/00411* (2013.01); *H04N 1/00708* (2013.01); *H04N 1/2104* (2013.01); *H04N 1/32496* (2013.01); *H04N 2201/0094* (2013.01)

(56) References Cited

U.S. PATENT DOCUMENTS

| | | | | |
|---|---|---|---|---|
| 5,946,527 | A * | 8/1999 | Salgado | B65H 1/04 271/3.01 |
| 6,151,478 | A * | 11/2000 | Katsuta | B65H 5/34 271/258.01 |
| 6,266,512 | B1 * | 7/2001 | de Koning | B65H 3/44 271/9.01 |
| 6,873,427 | B1 * | 3/2005 | Matsuda | H04N 1/00931 358/1.1 |
| 8,081,886 | B2 * | 12/2011 | Okano | G03G 15/6579 399/21 |
| 8,264,710 | B2 * | 9/2012 | Burkes | H04N 1/00931 358/1.13 |
| 8,274,711 | B2 * | 9/2012 | Hiro | H04N 1/0057 355/407 |
| 9,060,086 | B2 * | 6/2015 | Takahashi | H04N 1/00578 |
| 9,581,951 | B2 * | 2/2017 | Ono | G03G 15/50 |
| 2001/0024298 | A1 * | 9/2001 | Yoshida | H04N 1/21 358/444 |
| 2001/0051064 | A1 * | 12/2001 | Yokoyama | H04N 1/32561 400/70 |
| 2006/0109520 | A1 * | 5/2006 | Gossaye | H04N 1/0071 358/449 |
| 2006/0132821 | A1 * | 6/2006 | Nonaka | H04N 1/00127 358/1.13 |
| 2007/0036596 | A1 * | 2/2007 | Takahashi | G03G 15/50 399/381 |
| 2007/0102872 | A1 * | 5/2007 | Dekoning | H04N 1/00567 271/209 |
| 2007/0264063 | A1 * | 11/2007 | Sano | G03G 15/602 399/367 |
| 2008/0037035 | A1 * | 2/2008 | Okano | G03G 15/6579 358/1.1 |
| 2008/0187344 | A1 * | 8/2008 | Yoshizawa | G03G 15/6573 399/76 |
| 2009/0027729 | A1 * | 1/2009 | Trelewicz | G06K 15/02 358/3.06 |
| 2009/0033993 | A1 * | 2/2009 | Nakazato | G06F 3/1218 358/1.15 |
| 2009/0296167 | A1 * | 12/2009 | Motoyama | H04N 1/00748 358/474 |
| 2009/0297173 | A1 * | 12/2009 | Kojima | G03G 15/1605 399/16 |
| 2010/0073694 | A1 * | 3/2010 | Fujiwara | H04N 1/00681 358/1.2 |
| 2010/0091312 | A1 * | 4/2010 | Edwards | H04N 1/00758 358/1.13 |
| 2010/0142010 | A1 * | 6/2010 | Cui | H04N 1/00832 358/497 |
| 2010/0148420 | A1 * | 6/2010 | Hamano | B65H 3/0607 271/3.15 |
| 2010/0239344 | A1 * | 9/2010 | Mihara | B41J 13/0018 399/405 |
| 2011/0019821 | A1 * | 1/2011 | Kino | H04N 1/00411 380/255 |
| 2012/0013958 | A1 * | 1/2012 | Kattou | G03B 27/50 358/498 |
| 2012/0236056 | A1 * | 9/2012 | Ito | B41J 2/16585 347/14 |
| 2013/0043415 | A1 * | 2/2013 | Misao | G03G 15/6567 250/559.15 |
| 2013/0044339 | A1 * | 2/2013 | Takahashi | H04N 1/00801 358/1.13 |
| 2013/0083367 | A1 * | 4/2013 | Hara | B65H 29/60 358/449 |
| 2014/0036289 | A1 * | 2/2014 | Muroi | H04N 1/32443 358/1.13 |
| 2014/0044467 | A1 * | 2/2014 | Murayama | G03G 15/6567 399/395 |
| 2014/0085685 | A1 * | 3/2014 | Nanbu | H04N 1/00708 358/449 |
| 2014/0211277 | A1 * | 7/2014 | Ozaki | H04N 1/00588 358/496 |
| 2014/0270834 | A1 * | 9/2014 | Seshita | G03G 15/2042 399/68 |
| 2016/0342119 | A1 * | 11/2016 | Fukai | G03G 15/2028 |
| 2016/0381241 | A1 * | 12/2016 | Hata | H04N 1/00694 358/1.13 |

FOREIGN PATENT DOCUMENTS

| | | | | |
|---|---|---|---|---|
| JP | 2006135702 A | * | 5/2006 | |
| JP | 2009067559 A | * | 4/2009 | ........ H04N 1/00755 |
| JP | 2012049678 A | * | 3/2012 | |

* cited by examiner

FIG. 4

| SENSOR | A3 | A4 | B4 | B5 | A4R | A5 | B5R | B6 | A5R |
|---|---|---|---|---|---|---|---|---|---|
| WIDTH > 263.5 mm | ● | — | — | — | — | — | — | — | — |
| 263.5 mm ≥ WIDTH > 213.9 mm | — | ● | — | — | — | — | — | — | — |
| 213.9 mm ≥ WIDTH > 196 mm | — | — | ● | — | — | — | — | — | — |
| 196 mm ≥ WIDTH > 165 mm | — | — | — | ● | — | — | — | — | — |
| 165 mm ≥ WIDTH | — | — | — | — | ● | — | — | — | — |
| WIDTH DETECTION SENSOR | — | — | — | — | — | ● | — | — | — |
|  | — | — | — | — | — | — | ● | — | — |
|  | — | — | — | — | — | — | — | ● | — |
|  | — | — | — | — | — | — | — | — | ● |
| SENSOR 207 | ON | OFF | ON | OFF | OFF | OFF | OFF | OFF | OFF |
| SENSOR 208 | ON | OFF | ON | OFF | ON | OFF | ON | OFF | OFF |

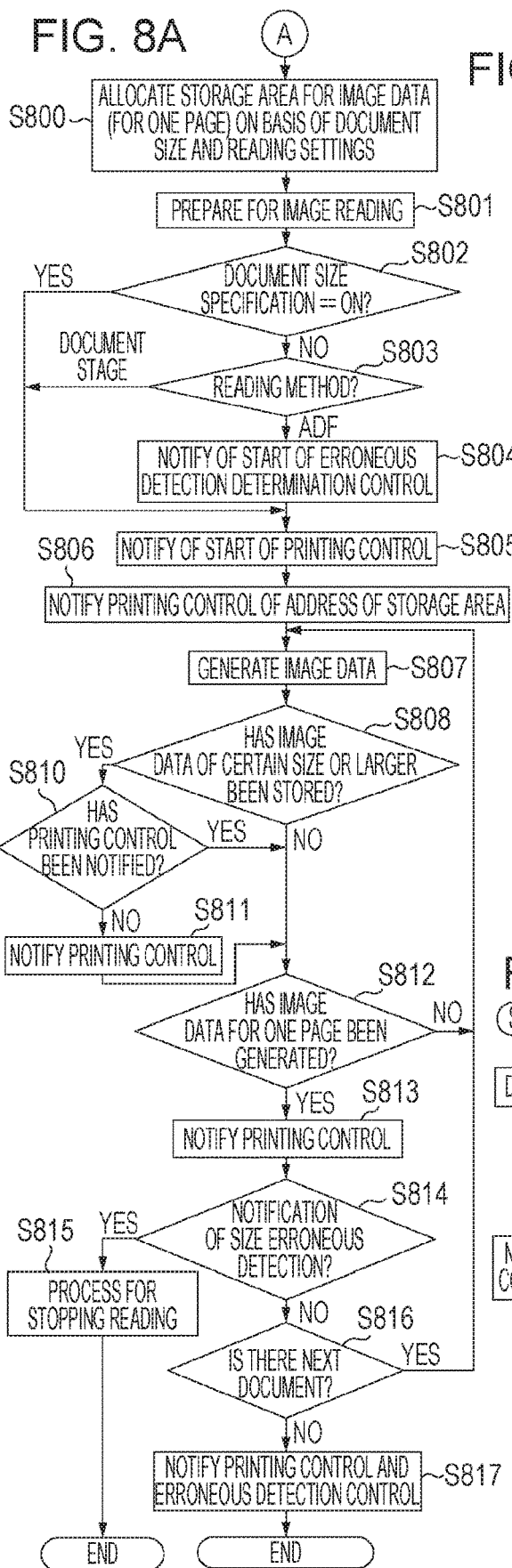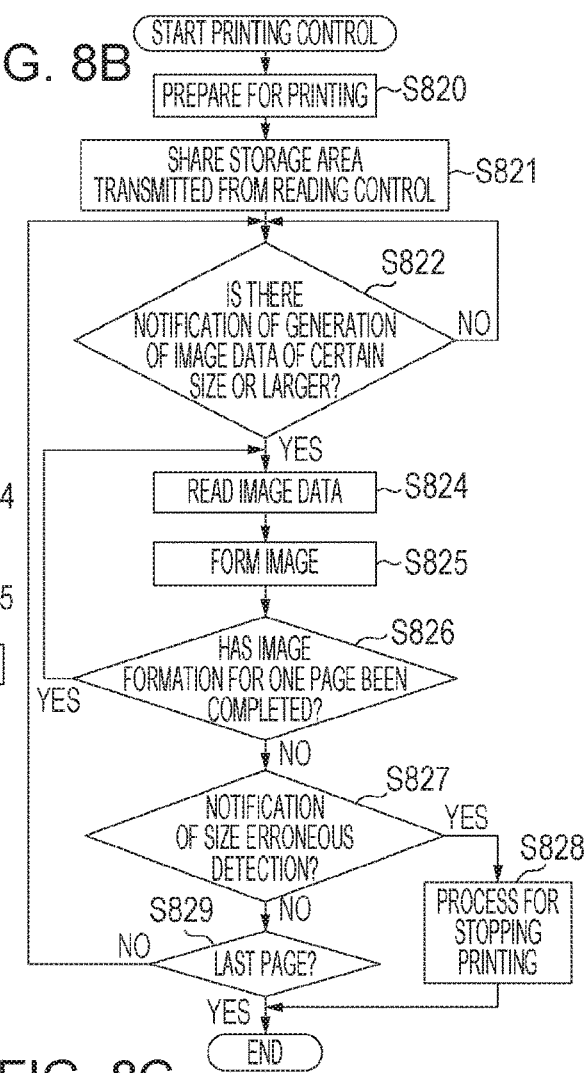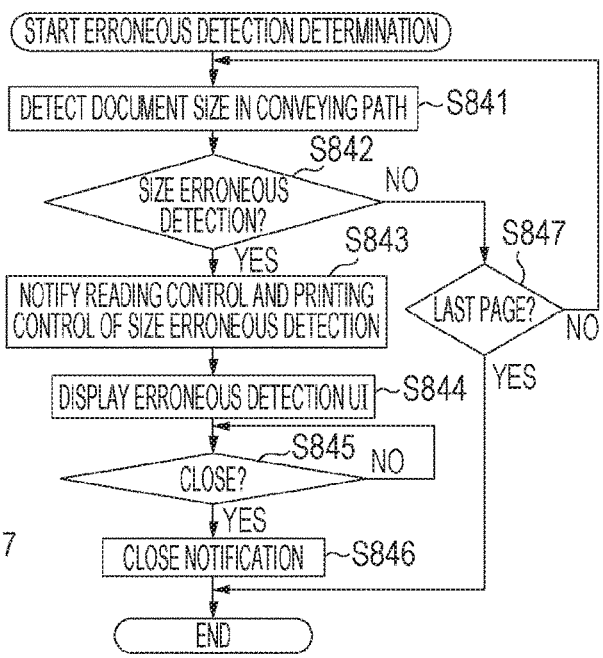

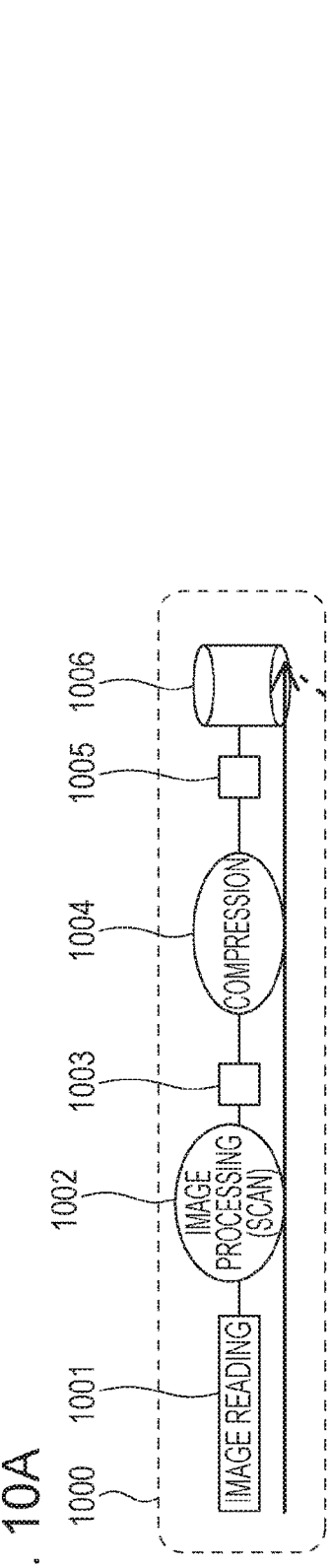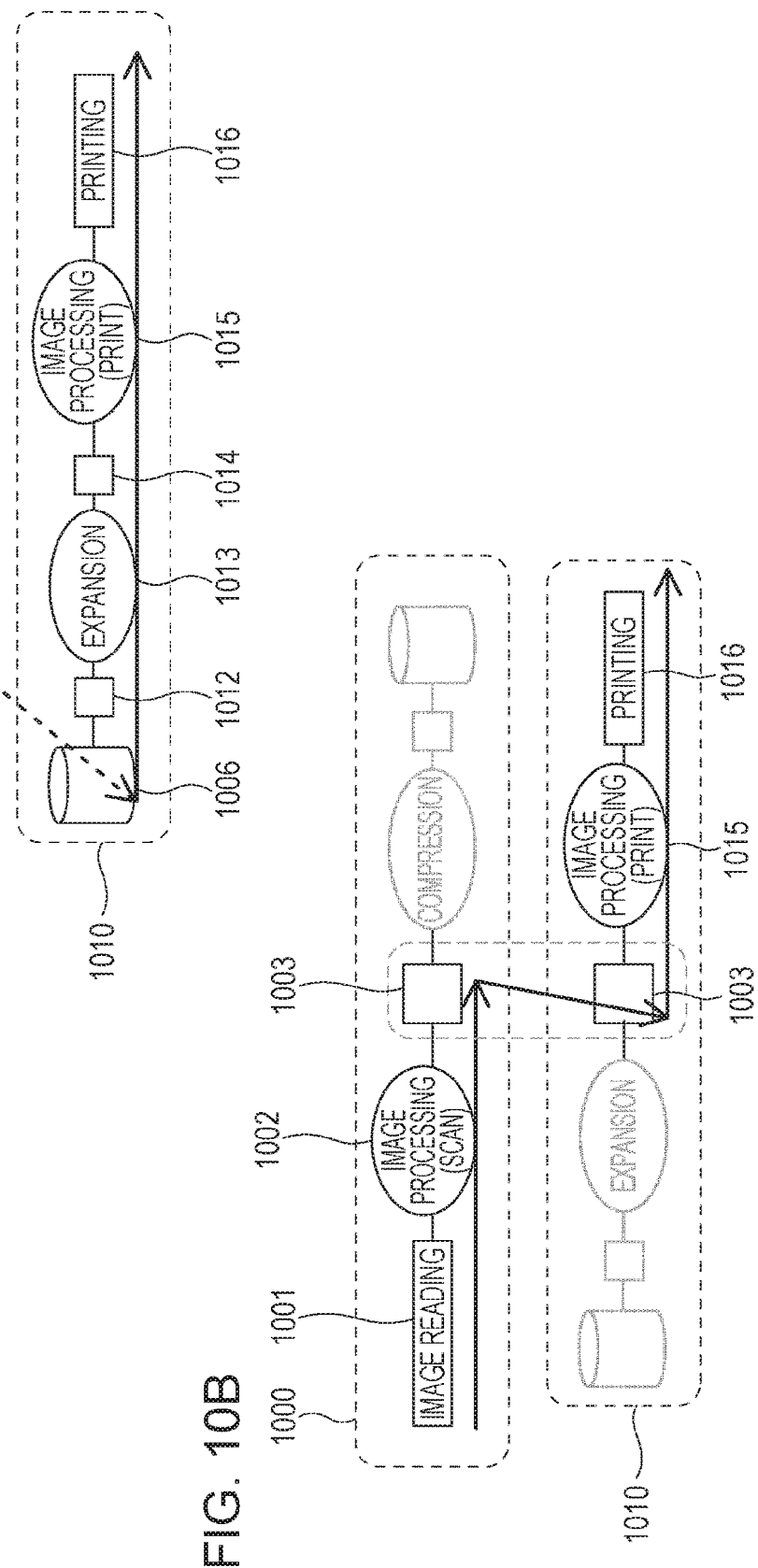

FIG. 11

| SETTING ITEMS | SETTING VALUE SATISFYING FCOT PRIORITY MODE | |
|---|---|---|
| DOCUMENT SIZE | ANY OF STANDARD SIZES (A3 TO A5, B4 TO B6, LETTER, AND THE LIKE) HAS BEEN CONFIRMED. | ⎫ 1101 |
| OUTPUT SHEET SIZE | OUTPUT SHEET SIZE HAS BEEN CONFIRMED. | |
| PAPER FEED CASSETTE | PAPER FEED CASSETTE TRAY HAS BEEN CONFIRMED. | |
| DOCUMENT MIXTURE | MIXTURE MODE OFF | ⎭ |
| IMAGE REPEAT | OFF | |
| ENLARGEMENT/ CONSECUTIVE SHOTS | OFF | |
| REDUCTION LAYOUT | 1 in 1 | |
| MIRROR IMAGE/ NEGATIVE-POSITIVE REVERSAL | OFF | |
| DIVISION READING | OFF | ⎬ 1102 |
| SCALING | NO SCALING (100%) IS SET | |
| IMAGE SHIFT | SHIFT PROCESS OFF | |
| BOOKBINDING LAYOUT | OFF | |
| COLOR MODE | COLOR OR MONOCHROME IS SET | |
| PRINT SETTING | NUMBER OF COPIES PRINTING OFF | |
| SIMPLEX/DUPLEX PRINTING SPECIFICATION | SIMPLEX PRINTING | } 1103 |

PRINTING CONTROL APPARATUS METHOD FOR CONTROLLING PRINTING CONTROL APPARATUS AND STORAGE MEDIUM

CROSS-REFERENCE TO RELATED APPLICATIONS

This application is a continuation of U.S. patent application Ser. No. 15/971,699, filed May 4, 2018, which is a continuation of U.S. patent application Ser. No. 14/964,415, filed Dec. 9, 2015, now U.S. Pat. No. 9,992,366, issued Jun. 5, 2018, which claims the benefit of International Patent Application No. PCT/JP2014/082992, filed Dec. 12, 2014, which are hereby incorporated by reference herein in their entirety.

TECHNICAL FIELD

Aspects of the present invention generally relate to a printing control apparatus that reads an image on a document and prints the image on a sheet.

BACKGROUND ART

In a printing control apparatus having a copy function, image data read by a reading unit is printed by a printing unit. As a method for reading an image on a document used at this time, a feed reading method is known. In the feed reading method, a document is set on a document setting unit, and an image on the document is read at a fixed position of an optical system while the document is being conveyed by a document conveying unit (ADF: Auto Document Feeder).

In addition, a technique for reducing time (First Copy Out Time: FCOT) taken until a first sheet is output when an image on a document is read and the read image is printed on a sheet is known. Printing on the first sheet is usually performed after reading of image data for one page ends. On the other hand, in PTL 1, reading of image data performed by a reading unit and transfer of the image data to a printing unit are performed as parallel processes, and printing starts before reading of image data for one page ends, in order to reduce the FCOT. In addition, in PTL 2, a printing control apparatus that determines, after a start button is pressed, whether job settings correspond to an FCOT mode is described. This printing control apparatus determines that the job settings correspond to the FCOT mode if parameters set for a job are certain parameters, such as the size of a document being A4, a reading scaling factor being 100%, a specified tray being a tray closest to a printing unit, and the size of a sheet being A4, and performs control for reducing the FCOT.

If the FCOT is to be reduced by starting printing without until reading of image data for one page ends, parameters relating to a reading process and a printing process need to be determined before a copy job starts. A reading size of a document, for example, needs to be determined as one of the parameters.

In addition, in a copying process, an operation for starting printing without waiting until reading of image data for one page ends might not be possible. If a function such as "scaling", in which printing is performed after the size of an image is changed, or "page integration", in which a plurality of pages are laid out on a surface of a sheet, is set, for example, processing on an image needs to be performed after image data for one page is read. Printing can therefore start only after the reading of the image data ends.

In addition, the following two types of method are known as a method for automatically detecting the size (document length and document width) of a document to be read by the ADF. A first method is a method in which the size of a document is detected by a sensor provided on the document setting unit. In addition, a second method is a method in which the size of a document is detected by a sensor provided along a conveying path.

If the size of a document is detected by the sensor on the document setting unit, the size of the document can be detected before reading starts, and the FCOT can be reduced using the above-described method. If the size of a document is detected on the document setting unit, however, erroneous detection might occur.

If the size of a document is detected on the document setting unit, a method for detecting the size of a sheet on the basis of whether a protrusion on the document setting unit is pressed by the sheet, for example, is used. In this method, however, the size of a document is erroneously detected if a rounded document (a curled document in the following description) or a document with a fold (a folded document in the following description) is set with part of the document not in place. In this case, for example, a curled document of A3 size is erroneously detected as having A4 size, and printing is performed with part of the actual document missing although the document of A3 size is copied.

On the other hand, if the method in which the size of a document is detected in the conveying path is used, the size of the document can be correctly detected even if the above-mentioned curled document or folded document is read. Since the size of the document is not detected before a starting of reading, however, the FCOT cannot be reduced using the above-described method.

Aspects of the present invention are established in view of the above and provide a mechanism for dynamically selecting a method for detecting the size of a document in accordance with conditions.

CITATION LIST

Patent Literature

PTL 1: Japanese Patent Laid-Open No. 2002-314763
PTL 2: Japanese Patent Laid-Open No. 2006-135702

SUMMARY OF INVENTION

A printing control apparatus according to an aspect of the present invention includes a reading unit for reading an image on a document and generating image data and a printing unit for printing the image performs a copy job using the reading unit and the printing unit. The printing control apparatus includes a conveying unit for conveying a document set on a document setting unit to the reading unit, a first detection unit for detecting a size of the document set on the document setting unit before the conveying unit starts to convey the document, a second detection unit for detecting the size of the document after the conveying unit starts to convey the document, and a control unit for performing the copy job based on the size of the document detected by the first detection unit in a case where the printing unit starts to print the image data before the reading unit finishes generating image data for one page and performing the copy job based on the size of the document detected by the second detection unit in a case where the printing unit starts to print the image data after the reading unit finishes generating image data for at least one page.

Further features of the present disclosure will become apparent from the following description of exemplary embodiments with reference to the attached drawings.

BRIEF DESCRIPTION OF DRAWINGS

FIG. 4 is a diagram illustrating a data model of a size detection table.

FIGS. 8A to 8C are flowcharts illustrating a control method for controlling execution of copying.

FIGS. 10A and 10B are conceptual diagrams of a copying process.

FIG. 11 is a diagram illustrating an example of operation conditions for an FCOT priority mode.

DESCRIPTION OF EMBODIMENTS

Embodiments of the present invention will be described in detail hereinafter with reference to the drawings. It is to be noted that the following embodiments do not limit aspects of the invention according to the claims, and not all combinations of characteristics described in the embodiments are needed to implement aspects of the present invention.

First Embodiment

Figure 1:
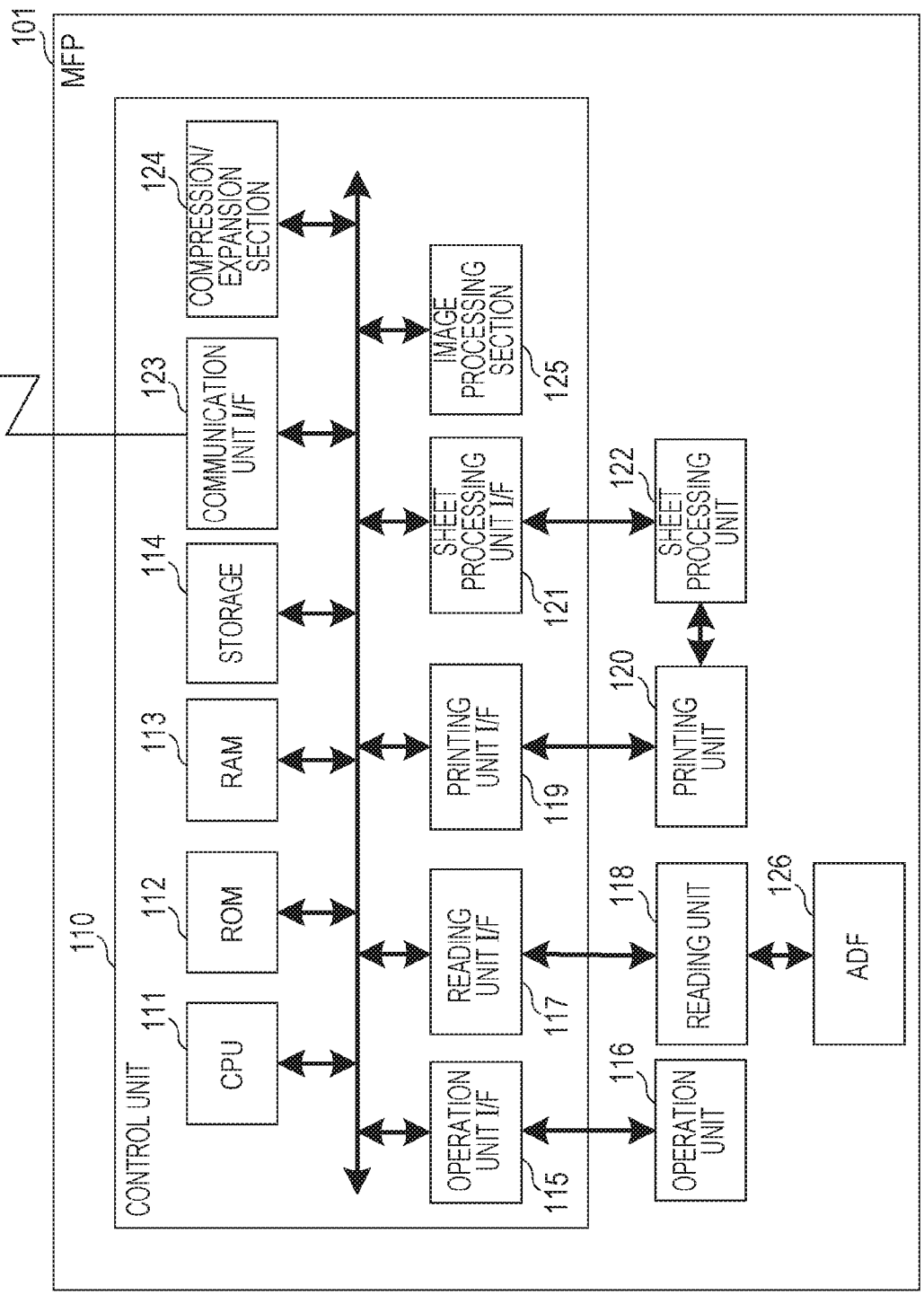
FIG. 1 is a block diagram illustrating the configuration of an MFP 101.
Figure 2:
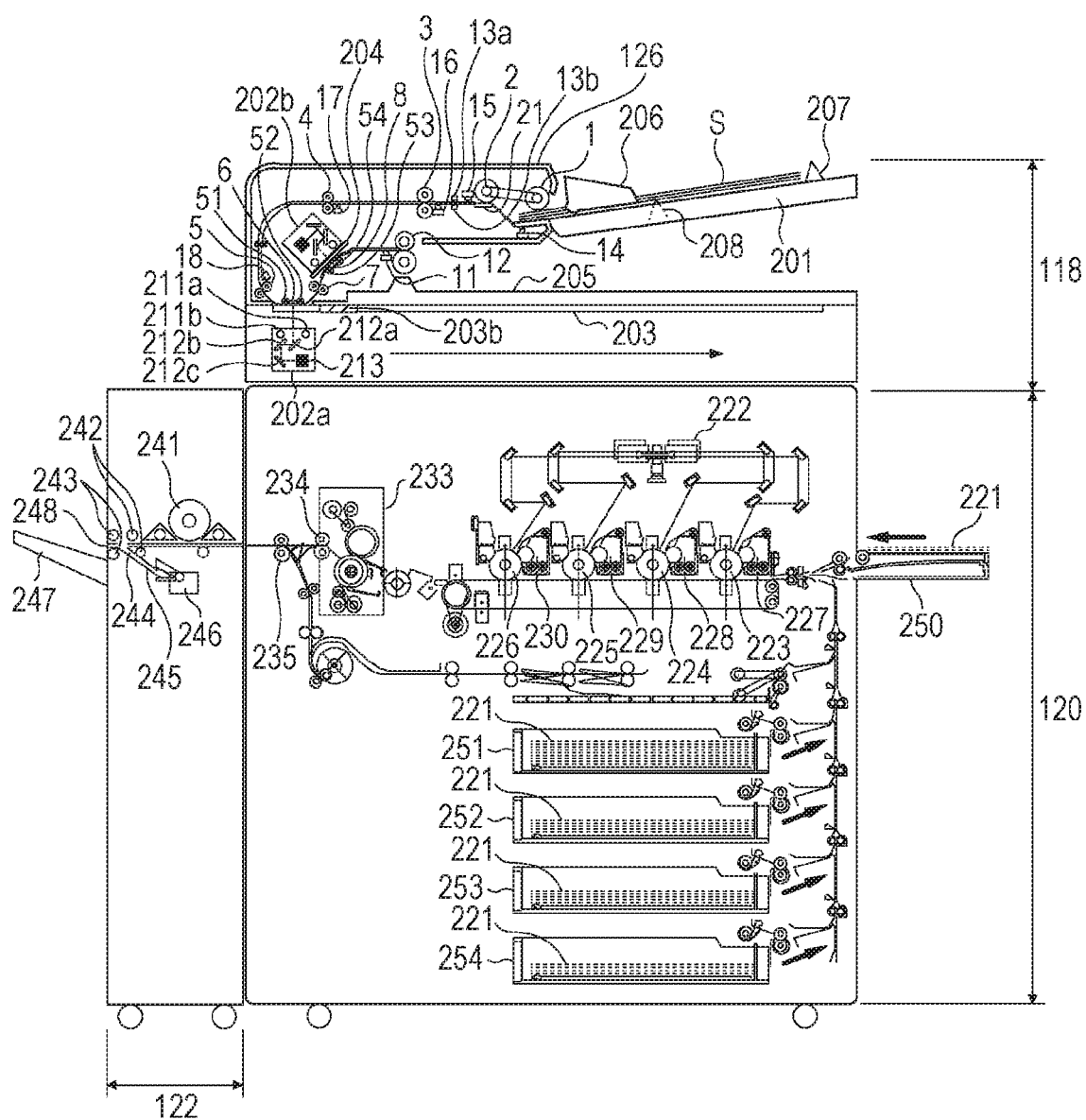
FIG. 2 is a cross-sectional view illustrating the configuration of the MFP 101.

First, a first embodiment will be described. FIG. 1 is a block diagram illustrating the hardware configuration of a printing control apparatus according to the present embodiment. In addition, FIG. 2 is a cross-sectional view of the hardware configuration of the printing control apparatus according to the present embodiment. An MFP (Multifunction Peripheral) 101 will be described in the present embodiment as an example of the printing control apparatus.

The MFP 101 has a reading function of reading an image on a document and generating image data and a printing function of printing the image on a sheet on the basis of the generated image data. It is to be noted that sheets include print sheets such as plain paper and thick paper, OHP sheets, and the like. It is to be noted that the MFP 101 may have a post-processing function of binding a plurality of sheets on which images have been printed, lining up a plurality of sheets, or distributing discharge destinations of a plurality of sheets to a plurality of discharge units. Furthermore, the MFP 101 may have a print function of receiving a print job from an external apparatus such as a PC and performing printing on a sheet on the basis of the print job. It is to be noted that although an MFP is described in the present embodiment as an example, aspects of the present invention can also be applied to, for example, a copying machine having a single copy function.

A control unit 110 including a CPU 111 controls the operation of the entirety of the MFP 101. The CPU 111 reads a control program stored in a ROM 112 or a storage 114 and performs one of various types of control, such as reading control, printing control, or copying control. In the ROM 112, a control program that can be executed by the CPU 111 is stored. A RAM 113 is a main storage memory of the CPU 111 and used as a temporary storage area into which a control program stored in a work area or the storage 114 is loaded. In the storage 114, image data, printing data, various programs, various pieces of history information, various pieces of setting information, and the like are stored. In addition, in the storage 114, the number of sheets subjected to printing performed by a printing unit 120, counter information relating to charging, and the like are stored. Although an auxiliary storage device such as an HDD is assumed as the storage 114 in the present embodiment, a flash disk represented by an SSD may be used instead of the HDD.

It is to be noted that although a single CPU 111 performs various processes described in flowcharts that will be referred to later using a single memory (RAM 113) in the MFP 101 according to the present embodiment, another mode may be implemented, instead. A plurality of CPUs, RAMs, ROMs, and storages, for example, may cooperatively perform the various processes described in the flowcharts that will be referred to later. Alternatively, part of the processes may be performed using a hardware circuit such as an ASIC or an FPGA.

An operation unit I/F 115 connects an operation unit 116 and the control unit 110 with each other. The operation unit 116 displays information to a user and receives an instruction from the user. For these purposes, the operation unit 116 includes a touch panel display that displays an operation screen that will be described later and various hard keys including a start button and a setting button. The user inputs an instruction using keys displayed on the touch panel display or the various hard keys. Alternatively, the operation unit 116 may include an indication display and various hard keys instead of the touch panel display. In this case, the user inputs an instruction using the hard keys. Alternatively, the operation unit 116 may be configured only by the touch panel display.

A reading unit I/F 117 connects a reading unit 118 and the control unit 110 with each other. The reading unit 118 reads an image on a document and converts the image into image data such as binary data. The image data generated by the reading unit 118 is transferred to an image processing section 125 through the reading unit I/F 117. Image data subjected to image processing such as binarization or a rotation process performed by the image processing section 125 is usually compressed by a compression/expansion section 124 and stored in the storage 114 of the control unit 110. The image data is transmitted to an external apparatus through a communication unit I/F 123 or printed on a sheet. It is to be noted that if a copying process is performed in an FCOT priority mode, which will be described later, the reading of a document performed by the reading unit 118 and the printing of the document that is being read can be performed in parallel with each other.

In addition, the reading unit 118 includes an ADF 126. The ADF 126 feeds a document 32 in accordance with a control command from the reading unit 118. The operation of the ADF 126 will be described with reference to FIG. 2.

A printing unit I/F 119 connects the printing unit 120 and the control unit 110 with each other. Image data to be printed (image data that is a print target) is transferred from the control unit 110 to the printing unit 120 through the printing unit I/F 119. The printing unit 120 receives a control command from the CPU 111 and the image data to be printed and prints an image based on the image data on a sheet such as a print sheet.

A sheet processing unit I/F 121 connects a sheet processing unit 122 and the control unit 110 with each other. The sheet processing unit 122 receives a control command from the CPU 111 and performs post-processing on a sheet subjected to the printing performed by the printing unit 120 in accordance with the control command.

In addition, the control unit 110 is connected to a network or the like through the communication unit I/F 123. The communication unit I/F 123 transmits image data and information to an external apparatus (a mail server, a file server, a PC, or the like) on a LAN (not illustrated) and receives image data and information from the external apparatus on the LAN. Furthermore, the communication unit I/F 123 communicates with an external apparatus through a network such as a wireless LAN (not illustrated) or an external apparatus through a local interface such as USB.

The compression/expansion section 124 performs a process for compressing or expanding image data or the like stored in the RAM 113 or the storage 114 using one of various compression methods, such as JBIG or JPEG. The image data compressed or expanded by the compression/expansion section 124 is stored in the RAM 113 or the storage 114 again.

The image processing section 125 performs an image conversion process on image data stored in the RAM 113 or the storage 114 in accordance with register values stored in the image processing section 125 and then stores the converted image data in the RAM 113 or the storage 114 again. The CPU 111 sets the register values stored in the image processing section 125 as necessary in order to perform desired image conversion process on image data. It is to be noted that the register values stored in the image processing section 125 include settings such as a color mode, a scaling factor (%) in an X direction, a scaling factor (%) in a Y direction, reading resolution (pixels/inch), output resolution, and a rotation angle (degrees).

Examples of the image conversion process include, for example, a rotation process for rotating image data by a specified angle in units of blocks (e.g., by 32 pixels×32 pixels or so), a process for converting resolution, a scaling process, a process for calculating a matrix of an image subjected to multi-value input, a process for converting color space, and the like.

Reading Realized Using Feed Reading Method

FIG. 2 is a cross-sectional view of the MFP 101. First, a feed reading method realized by the ADF 126 will be described. The ADF 126 includes a document setting unit 201 for setting documents S consisting of one or more documents. In addition, the ADF 126 includes a separation roller 2 for feeding one of the documents S set on the document setting unit 201 to a conveying path, a separation pad 21, and a pickup roller 1. The pickup roller 1 comes into contact with a document surface of the documents S set on the document setting unit 201 and rotates. As a result, documents on a top surface of the documents are fed to the conveying path. One of the documents fed by the power management system 1 is separated by friction between the separation roller 2 and the separation pad 21. In addition, a document detection sensor 14 is provided downstream of the document setting unit 201 and can determine whether a document is set on the document setting unit.

A multiple feeding detection sensor 13 determines whether the number of documents separated by the separation roller 2 and the separation pad 21 is 1. The multiple feeding detection sensor 13 is configured by an oscillation unit 13a and a reception unit 13b. The reception unit 13b receives an ultrasonic wave output from the oscillation unit 13a and determines whether the number of documents is 1 or more on the basis of the strength of received data. If multiple feeding of documents is detected, the CPU 111 stops feeding documents and displays a jam (paper jam) screen on the operation unit 116.

The document that has passed through the multiple feeding detection sensor 13 is conveyed toward register rollers 4 by a drawing roller pair 3. The document comes into contact with the register rollers 4. As a result, the document takes a form of a loop and diagonal feeding of the document is prevented. A feed path that conveys the document that has passed through the register rollers 4 toward a document stage glass 203 is provided downstream of the register rollers 4.

In addition, a control CPU (not illustrated) of the ADF 126 detects a leading edge of the document using a pre-register sensor 15 configured by a photocoupler or the like in order to detect a timing of reading of the document or the like. The control CPU starts to count driving clocks of a conveying motor (not illustrated), which serves as a driving source of the rollers 3, 4, and 5 when the sensor 15 senses the leading edge of the document and turns on. The amount of movement of a document per driving clock is always the same. By starting to count driving clocks when the sensor 15 turns on, therefore, it is possible to measure how far the document has been conveyed (a position of the leading edge of the document). The ADF 126 and the reading unit 118 start to read a front surface on the basis of a result of the measurement when the leading edge of the document conveyed from the document setting unit 201 reaches a document front surface reading position on the glass 203. In addition, the ADF 126 and the reading unit 118 start to read a back surface when the leading edge of the document conveyed from the document setting unit 201 reaches a document back surface reading position.

The document conveyed to the feed path is conveyed to a front surface feed reading position on the glass 203 by conveying rollers 5, an upstream roller 51, and a downstream roller 52. The document comes into contact with the glass 203 while being sufficiently pressed by the upstream roller 51 and the front surface reading downstream roller 52.

When a timing of a starting of reading of the front surface comes, the reading unit 118 controls an optical unit (also referred to as a reading unit) 202a. The optical unit 202a includes light sources 211a and 211b, mirrors 212a, 212b, and 212c, and a line sensor 213. The reading unit 118 turns on the light sources 211a and 211b and radiates light onto the document that is passing by a surface of the glass 203 at constant speed. Light reflected from the document is incident on the line sensor 213 through the mirrors 212a, 212b, and 212c. The line sensor 213 converts the light reflected from the document into an electric signal. A CCD image sensor or the like, for example, is used as the line sensor 213. An A/D converter, which is not illustrated, converts the electric signal into digital data (image data) and stores the digital data in the storage 114 or the RAM 113 of the control unit 110.

It is to be noted that, in the present embodiment, stick-shaped light sources are used as the light sources 211a and 211b. A reading line parallel to a longitudinal direction of the light sources 211a and 211b is set, and image data is generated by conveying the document in a direction perpendicular to the reading line. It is to be noted that the length of a document in a direction (main scanning direction) parallel to the reading line is defined as document width. In addition, the length of a document in the direction (a conveying direction or a sub-scanning direction) perpendicular to the reading line is defined as document length.

The document conveyed by the downstream roller 52 is conveyed to the back surface reading position on a glass 204 by conveying rollers 7, an upstream roller 53, and a downstream roller 54. The document comes into contact with the glass 204 while being sufficiently pressed by the upstream roller 53 and the downstream roller 54. When a timing of a starting of reading of the back surface comes, the reading unit 118 controls an optical unit 202b to read an image on the document. It is to be noted that a reading method is the same as one adopted by the optical unit 202a. The document conveyed by the downstream roller 54 passes by a discharge sensor 11 and is conveyed to a discharge unit 205 by discharge rollers 12. It is to be noted that if only one surface of a document is to be read, the document is discharged to the discharge unit 205 without performing the reading of the back surface that would otherwise be performed by the optical unit 202b.

In addition, the ADF 126 calculates the document length of the document on the basis of time taken until a trailing edge of the document passes by the sensor 15 after the leading edge of the document passes by the sensor 15 and the conveying speed of the document. The control CPU of the ADF 126 obtains the number of driving clocks, for example, measured until the sensor 15 turns off after the sensor 15 senses the leading edge of the document and turns on. The control CPU calculates the document length of the document on the basis of the number of driving clocks obtained and the amount of movement that the document makes in each driving clock because of the rollers. In addition, the ADF 126 can detect the document width using a document width detection sensor (not illustrated) provided along the conveying path. On the basis of a combination of these pieces of data, the size of the document can be detected in the conveying path (a second detection unit in the following description).

Although the calculation of the document length in the conveying path of the ADF 126 is realized using the above-described method in the present embodiment, aspects of the present invention are not limited to this. A process for correcting the document length, for example, may be performed in consideration of slipping of a document that is being conveyed, the component precision of the conveying rollers and the document conveying path, the meandering of a document in the document conveying path, and the like. Furthermore, the document length may be calculated using another method, instead. Alternatively, the document length in the conveying path of the ADF 126 may be calculated using a plurality of sensors (e.g., sensors 15 to 18).

In addition, although the detection of the document width in the conveying path of the ADF 126 is realized using the above-described method in the present embodiment, aspects of the present invention are not limited to this. A result of detection of the document width performed by the width detection sensor of a guide 206 on the document setting unit 201, for example, may be used for the detection of the document width, instead.

As described above, in the feed reading method used by the ADF 126, a plurality of documents can be consecutively read by repeating an operation for reading the documents S set on the document setting unit 201 one by one and discharging the document to the discharge unit 205. It is to be noted that although an ADF that reads the front surface and the back surface of a sheet in a single conveying path has been described in the present embodiment as an example, aspects of the present invention are not limited to this. The present embodiment can be applied even if, for example, an ADF reads the front and back of a sheet using a single optical unit. In this case, a sheet may be reversed using a reversal path (not illustrated) that reverses a sheet, and the optical unit 202a may read the sheet again.

Furthermore, the ADF 126 can detect the size of a document set on the document setting unit 201 (a first detection unit in the following description).

Figure 3:
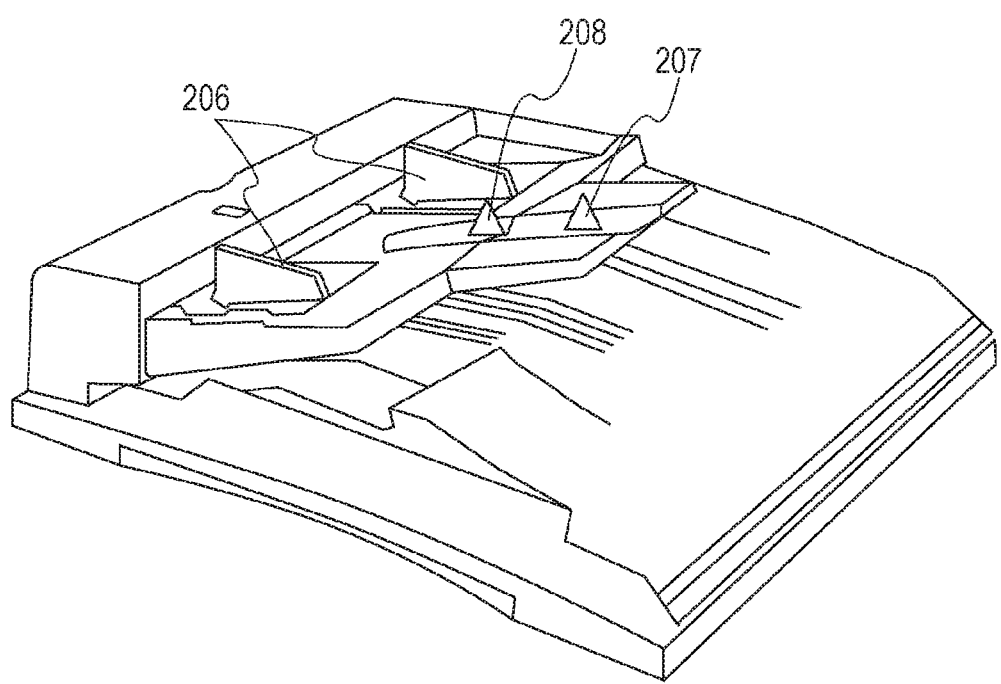
FIG. 3 is a diagram illustrating the appearance of an ADF 126.

FIG. 3 is a perspective view illustrating the document setting unit 201 of the ADF 126. The document guide 206 is a guide used by the user to set documents on the document setting unit 201. The width detection sensor (not illustrated) cooperates with the guide 206 to detect the document width of a document in accordance with a position of the guide 206. It is to be noted that the user sets a document on the document setting unit 201 after adjusting the guide 206 to the width of the print sheet.

Sensors 207 and 208 are length detection sensors for detecting the document length of a document set on the document setting unit 201. The sensors 207 and 208 protrude on an upper surface, for example, of the document setting unit 201 and output ON when pressed (208 in FIG. 2) by a document set. On the other hand, when not pressed, the sensors 207 and 208 output OFF. The CPU 111 detects the document length by three levels of resolution on the basis of outputs of the sensors 207 and 208. Although a configuration in which the sensor 207 and the sensor 208 are used for detecting the document length has been described in the present embodiment, aspects of the present invention are not limited to this. A detection method in which presence or absence of a document is optically detected or the like, for example, may be used, instead.

FIG. 4 is a diagram illustrating an example of a condition table for detecting the size of a document set on the document setting unit 201. The CPU 111 refers to the table illustrated in FIG. 4 on the basis of values detected by the width detection sensor of the guide 206, the sensor 207, and the sensor 208 in order to detect the size. It is to be noted that a document when short sides thereof are set parallel to the above-mentioned reading line will be referred to as having an R size (A5R, A4R, or the like), and a document when long sides thereof are set parallel to the reading line will be referred to as A5, A4, or the like. In addition, since long sides of an A3 document or a B4 document cannot be set parallel to the reading line, the A3 document or the B4 document will be simply referred to as "A3" or "B4" by omitting the R even when short sides thereof are set parallel to the reading line.

If the value detected by the width detection sensor is larger than 263.5 mm and the sensors 207 and 208 are both ON, for example, the CPU 111 detects the size as A3 (document width: 297 mm, document length: 420 mm). On the other hand, if the value detected by the width detection sensor is larger than a document width of 263.5 mm and the sensors 207 and 208 are both OFF, the CPU 111 detects the size as A4 (document width: 297 mm, document length: 210 mm).

As described above, if document widths of documents set on the document setting unit 201 are the same, whether the documents are set longitudinally or laterally is determined on the basis of whether the sensors 207 and 208 are pressed.

Here, if the user sets a curled document, which has a rounded shape, or a folded document, which has a fold, on the document setting unit 201, a trailing edge of the document might float and not press the sensor 207 or 208. In this case, the CPU 111 does not detect the size of the actually set document but erroneously detects that a document whose size is half the actually size is set.

It is to be noted that although size detection of an AB series has been described in the present embodiment as an example, the size can be detected with the same mechanisms even when an inch series or an AB/inch mixture series is adopted. In the case of the inch series, for example, the size can be detected by referring to a condition table for the inch series. In addition, in the case of the AB/inch mixture series, the size can be detected by referring to a condition table for the mixture series.

Reading Realized Using Optical System Movement Method

Alternatively, reading can be performed by fixing the optical unit 202a at the front surface reading position and setting a single document on the glass 203 instead of performing a reading operation in which feed reading is performed (an optical system movement method in the following description). In the case of this method, the document set on the glass 203 is scanned while moving the optical unit 202a in the sub-scanning direction indicated by an arrow illustrated in FIG. 2. Light reflected from the document is read by the line sensor 213 and converted into image data. It is to be noted that a white board 203b is a white board for creating white-level reference data for correcting shading.

Figure 5A:
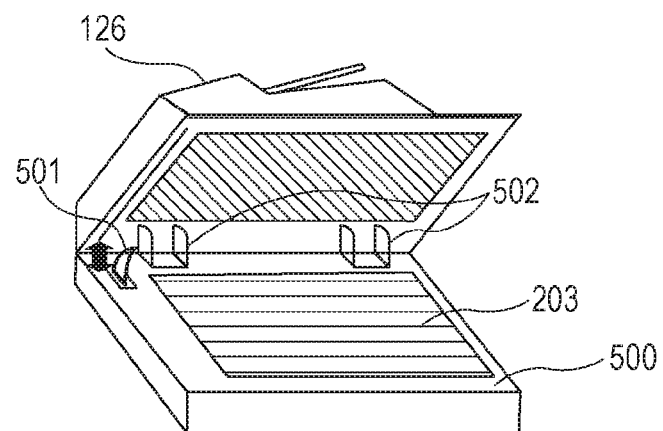
FIGS. 5A and 5B are diagrams illustrating the configuration of a reading unit 118.
Figure 5B:
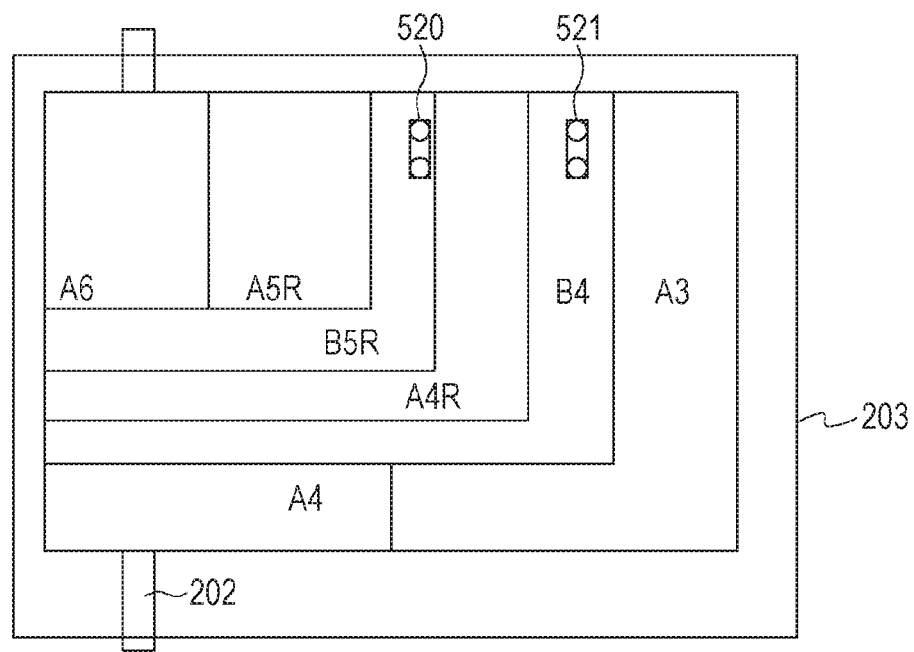

Next, a method for detecting the size of a document in the optical system movement method will be described. FIG. 5A is a perspective view illustrating the reading unit 118, and FIG. 5B is a plan view of the glass 203 of the reading unit 118 viewed from above.

As illustrated in FIG. 5A, the user can open and close the ADF 126 about hinges 502. When the ADF 126 is open and the document stage 500 is exposed, the user can set a document on the glass 203. In addition, the ADF 126 also functions as a pressure plate that fixes a document set on the glass 203.

An open/close sensor 501 detects OFF if the angle of the ADF 126 is equal to or larger than a certain value (e.g., 15° or so) and detects ON if the angle is smaller than the certain value (that is, the ADF 126 is about to be closed or closed).

If an output of the sensor 501 changes from OFF to ON, the CPU 111 turns on the light sources 211a and 211b and reads at least one line using the line sensor 213. The CPU 111 detects a portion in which light is blocked by and reflected from a document and a portion in which light is not blocked and reflected light does not return because there is no document, in order to detect the document width of the document on the basis of a result of the detection. On the other hand, the document length of the document is detected by a plurality of reflective sensors 520 and 521 arranged as illustrated in FIG. 5B. The reflective sensors 520 and 521 emit infrared light from their light-emitting units located below the document stage glass 203 and receive light reflected from the document using their light-receiving units. The CPU 111 detects the document length by three levels of resolution on the basis of outputs of the sensors 520 and 521. On the basis of the document width detected in this manner and the document length detected by the three levels of resolution, it is possible to detect which standard size a document has (a third detection unit in the following description).

It is to be noted that when the size of a still document set on the document stage glass 203 is detected, the ADF 126 functions as a pressure plate that fixes the document set on the glass 203. When the size of a document set on the document stage glass 203 is detected in the present embodiment, therefore, it is assumed that a problem such as the above-described curled document or folded document does not arise.

Printing Process

Returning to the description of FIG. 2, an operation (printing operation) for outputting an image onto a sheet 221 using the printing unit 120 will be described.

A laser unit 222 converts image data into laser light on the basis of the image data transferred to the printing unit 120. The laser light generated by the laser unit 222 is radiated onto photosensitive drums 223 to 226, and electrostatic latent images according to the image data are formed on the photosensitive drums 223 to 226 (exposure process). Developing units 227 to 230 apply toner (developer) to latent image portions of the photosensitive drums 223 to 226 subjected to the exposure process using laser (developing process).

Next, the printing unit 120 feeds a sheet 221 from any of cassettes 251 to 254 and a manual tray 250. The toner applied to the photosensitive drums 223 to 226 is transferred to a first surface of the fed sheet 221 (transfer process). The sheet to which the toner is applied through the transfer process is conveyed to a fuser 233. The fuser 233 fuses the applied toner on the sheet 221 with heat and pressure (fusing process). In the case of simplex printing, the sheet 221 that has passed through the fuser 233 is conveyed to the sheet processing unit 122 by conveying rollers 234 and 235.

It is to be noted that, in the case of duplex printing, the sheet whose first surface has been subjected to the printing in the fuser 233 is conveyed to the reversal path, which is not illustrated, and reversed. The printing unit 120 prints an image corresponding to a next page on a second surface (back surface) of the reversed sheet in the same procedure as for the first surface. The sheet 221 whose second surface has been subjected to the printing is conveyed to the sheet processing unit 122 by the conveying rollers 234 and 235.

It is to be noted that the cassettes 251 to 254 and the manual tray 250 are paper feed trays (sheet feed unit). The cassettes 251 to 254 have shapes of drawers, and a plurality of sheets can be stored therein. On the other hand, the manual tray 250 has an insertable shape, and a plurality of sheets 221 can be set therein.

The sheet conveyed to the sheet processing unit 122 is fed to a buffer unit 241. The buffer unit 241 can adjust conveying intervals of sheets conveyed from a main body if the post-processing (e.g., a binding process or a punch process) or the like performed downstream takes time.

The sheet that has passed through the buffer unit 241 is conveyed along a conveying path 244 by an upstream discharge roller pair 242 and a downstream discharge roller pair 243 and temporarily stacked on a stack tray 245. If determining that sheets corresponding to one copy are stacked on the stack tray 245, the sheet processing unit 122 performs the post-processing on the sheets. If the binding process is specified as a job, for example, a binding unit 246 performs the binding process on the sheets stacked on the stack tray 245. The sheets stacked on the stack tray 245 and subjected to the post-processing in accordance with job settings is conveyed along a conveying path 248 and discharged to a discharge tray 247.

It is to be noted that if the MFP 101 does not include the sheet processing unit 122, a sheet that has passed through the fuser 233 is discharged to a discharge unit (not illustrated) included in the MFP 101. In addition, although a color MFP including four photosensitive drums and four developing units has been described in the present embodiment as an example, aspects of the present invention are not limited to this. The MFP 101 may be a monochrome MFP including one photosensitive drum and one developing unit. In addition, a printing method according to the present embodiment is not limited to an electrophotographic method but may be another printing method such as an inkjet method or a heat transfer method.

Copying Process

In the present embodiment, when the MFP 101 performs the copying process, control for selecting a method for detecting the size of a document is performed in accordance with whether to perform an operation for reducing the FCOT. FIGS. 6 to 8 are flowcharts illustrating control of the copying process. Each operation (step) illustrated in the flowcharts of FIGS. 6 to 8 is realized when the CPU 111 has read a control program stored in the ROM 112 or the storage 114 to the RAM 113 and executed. In addition, the flowcharts of FIGS. 6 to 8 are realized when the control programs and components connected to the control unit 110 cooperate with one another.

Figure 6A:
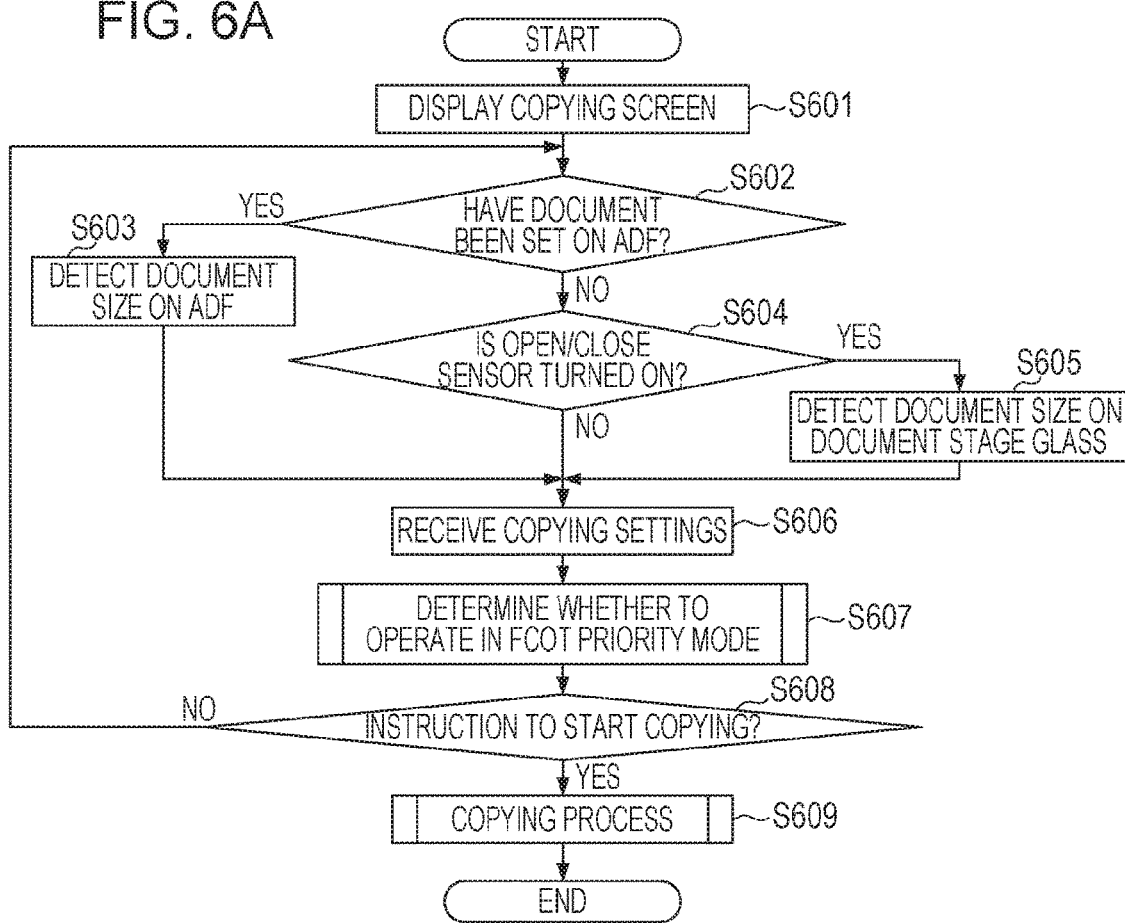
FIGS. 6A and 6B are flowcharts illustrating a control method for controlling execution of copying.
Figure 9:
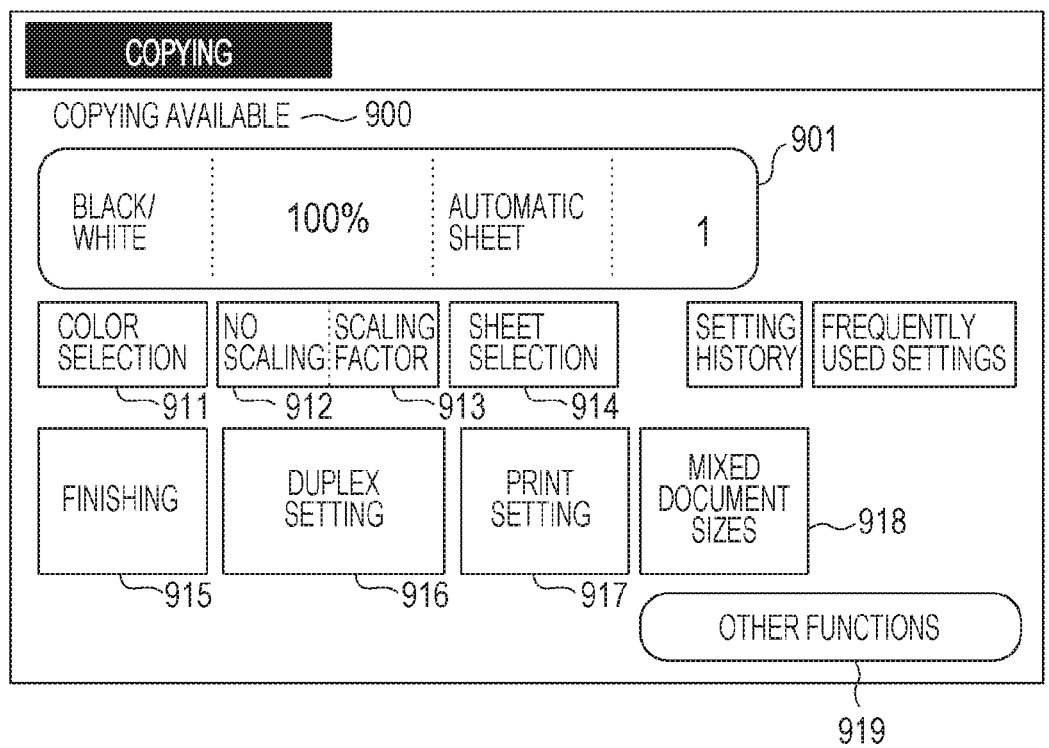
FIG. 9 is a diagram illustrating an operation screen displayed on an operation unit 116.

If the user selects copying on a main screen (not illustrated) displayed on the operation unit 116, the CPU 111 executes a control program indicated by the flowchart of FIG. 6(A). First, in step S601, the CPU 111 controls the operation unit 116 such that an operation screen for setting the copying is displayed. FIG. 9 is a diagram illustrating an example of a copying screen. The user can set details of a copy job through the screen illustrated in FIG. 9. Information 900 indicates that execution of a copy job can be started by pressing a start key (not illustrated) provided as a hard key outside the screen.

An operation key 911 is an operation key used for selecting an output color of a print. The user operates the operation key 911 to select black and white, color, or automatic selection. It is to be noted that if "automatic selection" is selected, the color of a document is automatically identified from a read image. A color document can be output in colors, and a monochrome document can be output in monochrome. An operation key 912 is an operation key used for setting a scaling factor for a print relative to the size of a document as no scaling. On the other hand, an operation key 913 is an operation key used for changing the scaling factor for a print relative to the size of a document to an arbitrary value. An operation key 914 is an operation key used for selecting a print sheet used for printing. The user operates the operation key 914 to specify a print sheet (sheet) used for printing among print sheets (sheets) associated with the paper feed trays (the cassettes 251 to 254 and the manual tray 250).

It is to be noted that information 901 notifies the user of settings relating to copying and the number of copies set with the operation key 911 to the operation key 914. It is to be noted that the user can input the number of copies through a numeric keypad (not illustrated) provided as hard keys outside the screen.

An operation key 915 is an operation key used for setting finishing such as the binding process, the punch process, or sorting for prints. An operation key 916 is an operation key used for setting reading of a surface of a document or reading of both surfaces of the document. An operation key 917 is an operation key used for setting a printing function for a copy job. The printing function is a function of printing and embedding a certain character string or mark or the like on image data generated by the reading unit 118.

An operation key 918 is an operation key used for reading documents of different sizes (mixed documents in the following description). In addition, an operation key 919 is an operation key for shifting to a screen in which other settings relating to copying are made in addition to the currently displayed settings. In addition, by pressing the start key provided as a hard key outside the screen, the user can start a copy job.

Returning to the description of FIG. 6A, in step S602, the CPU 111 determines whether a document is set on the ADF 126. If determining that a document is set on the ADF 126 in accordance with an output value of the document detection sensor 14, the CPU 111 proceeds to step S603. If determining that a document is not set, the CPU 111 proceeds to step S604.

In step S603, the CPU 111 detects the size of the document set on the document setting unit of the ADF 126. The CPU 111 obtains output values of the width detection sensor, the sensor 207, and the sensor 208. In addition, the CPU 111 refers to the table illustrated in FIG. 4 as an example using the obtained output values as conditions to detect the size of a document corresponding to the conditions. The CPU 111 sets the detected size of the document and a method in which the document set on the ADF 126 is read as job parameters.

It is to be noted that the CPU 111 may detect the size of the document again if the output values of the sensor 207 and the sensor 208 change. Furthermore, if the output of the sensor 14 shifts to OFF, the CPU 111 may remove a result of the detection of the size of the document and change the method to be used to the method in which a document set on the document stage is read.

It is to be noted that, in the present embodiment, the method in which a document is read from the document stage glass 203 is set as a default parameter of the reading method. If a document is not set on the ADF 126, therefore, the method in which a document is read from the document stage glass 203 is set.

On the other hand, if detecting in step S604 that an output value of the open/close sensor 501 changes from OFF to ON, the CPU 111 proceeds to step S605. On the other hand, if the output value of the open/close sensor 501 does not change, the CPU 111 proceeds to step S606.

In step S605, the CPU 111 detects the size of a document on the document stage glass 203. The CPU 111 obtains output values of the reflective sensors 520 and 521 to detect the document length of the document. In addition, the CPU 111 reads an image for one line using the line sensor 213 to detect the document width of the document, and detects the size of the document set on the document stage on the basis of the detected document width and document length. The CPU 111 sets the detected size of the document and the method in which a document set on the document stage glass 203 is read as job parameters.

It is to be noted that if the size of the document cannot be detected on the basis of the document width and the document length, the CPU 111 sets the reading method in which a document set on the document stage is read as a job parameter and issues an inquiry about the size of the document after receiving an instruction to start copying.

Next, in step S606, the CPU 111 receives settings for the copy job through the screen illustrated in FIG. 9. In step S607, the CPU 111 determines whether to operate in the FCOT priority mode on the basis of the copy job settings received in step S606 and the job parameters to determine an operation mode of the copying process. Details will be described with reference to the flowchart of FIG. 6B.

Next, in step S608, the CPU 111 determines whether the start key (not illustrated) has been pressed. The start key is provided on the operation unit 116. If the start key has been pressed, the CPU 111 proceeds to step S609. On the other hand, if the start key has not been pressed, the CPU 111 returns to step S602.

In step S609, the CPU 111 performs a copying process in a normal mode or a copying process in the FCOT priority mode on the basis of the operation mode determined in step S607 and ends the process. Details of step S609 will be described with reference to the flowcharts of FIGS. 7 and 8.

Outline of FCOT Priority Mode

Copying operations according to the present embodiment include at least two copying operations in the FCOT priority mode for reducing the FCOT and the normal copy mode. FIGS. 10A and 10B are conceptual diagrams schematically illustrating a copy control flow in the normal copy mode and a copy control flow in the FCOT priority mode. FIG. 10A illustrates the copy control flow in the normal copy mode, and FIG. 10B illustrates the copy control flow in the FCOT priority mode.

First, the normal copy mode will be described using FIG. 10A. In the normal copy mode, printing in a printing process 1010 is performed after reading in an image reading process 1000 is performed. The image reading process 1000 indicates a pipeline of the reading process, and the printing process 1010 indicates a pipeline of the printing process. The MFP 101 realizes the copying process by combining the image reading process 1000 and the printing process 1010 with each other.

In a reading unit process 1001, the reading unit 118 is controlled to read image data for certain lines. It is to be noted that the number of certain lines in the normal copy mode is appropriately set in accordance with the size of a buffer memory set in accordance with the copy job settings, the performance of the image processing section 125, and the like. The image data for certain lines is transferred to scan image processing 1002. The scan image processing 1002 indicates image processing performed by the image processing section 125, and image data obtained by performing image processing on the image data for certain lines is stored in a buffer memory 1003. Buffer memories 1003 and 1005 are secured in the RAM 113. The image data for certain lines stored in the buffer memory 1003 is then compressed by the compression/expansion section 124.

A compression process 1004 indicates the compression process performed by the compression/expansion section 124, in which the image data for certain lines is subjected to coding, and a result of the process is stored in the buffer memory 1005. The image data for certain lines stored in the buffer memory 1005 is stored in an image storage area 1006 of the storage 114. The CPU 111 repeats these pipeline processes to store image data for one page in the image storage area 1006. After the image data for one page is stored in the image storage area 1006, the pipeline process of the printing process starts. In the printing process 1010, part of the image data stored in the image storage area 1006 is read to a buffer memory 1012. The read image data is expanded in an expansion process 1013, subjected to image processing in print image processing 1015, and transferred to a printing unit process 1016. Next, in the printing unit process 1016, the printing unit 120 is controlled to print the image data subjected to the image processing on a sheet.

Next, the FCOT priority mode will be described using FIG. 10B. The FCOT priority mode is a mode in which writing of image data read by the reading unit 118 to the buffer memory 1003 and transfer of data from the buffer memory 1003 to the printing unit are performed as parallel processes. In the FCOT priority mode in the present embodiment, data is transferred to the printing unit 120 without using the storage 114, whose access speed is lower than that of a memory area.

In the operation in the FCOT priority mode, the image reading process 1000 and the printing process 1010 share the single buffer memory 1003. The image reading process 1000 starts to write the image data to the buffer memory 1003. If image data of a certain size or larger is stored in the buffer memory 1003, the printing process 1010 starts to read the image data from the buffer memory 1003 and performs the printing process. It is to be noted that the certain size is appropriately set in accordance with parameters such as the reading speed of the reading unit 118 and the image forming speed of the printing unit 120.

As described above, in the FCOT priority mode, image data starts to be transferred to the printing process 1010 and the printing process starts without waiting until reading of image data for one page ends. The FCOT can therefore be reduced by a length corresponding to time taken to compress read image data and store the image data in the storage 114 and time taken to load the image data from the storage 114 and expand the image data. Since image data whose compression rate is low is shared with the printing process 1010, however, a large memory area needs to be secured.

In the operation in the FCOT priority mode, too, image data may be stored in the storage 114. These pieces of image data are used for recovery or the like if, for example, the printing process 1010 is not completed due to an error such as a jam during image formation.

Determination of Copying Process Mode

Figure 6B:
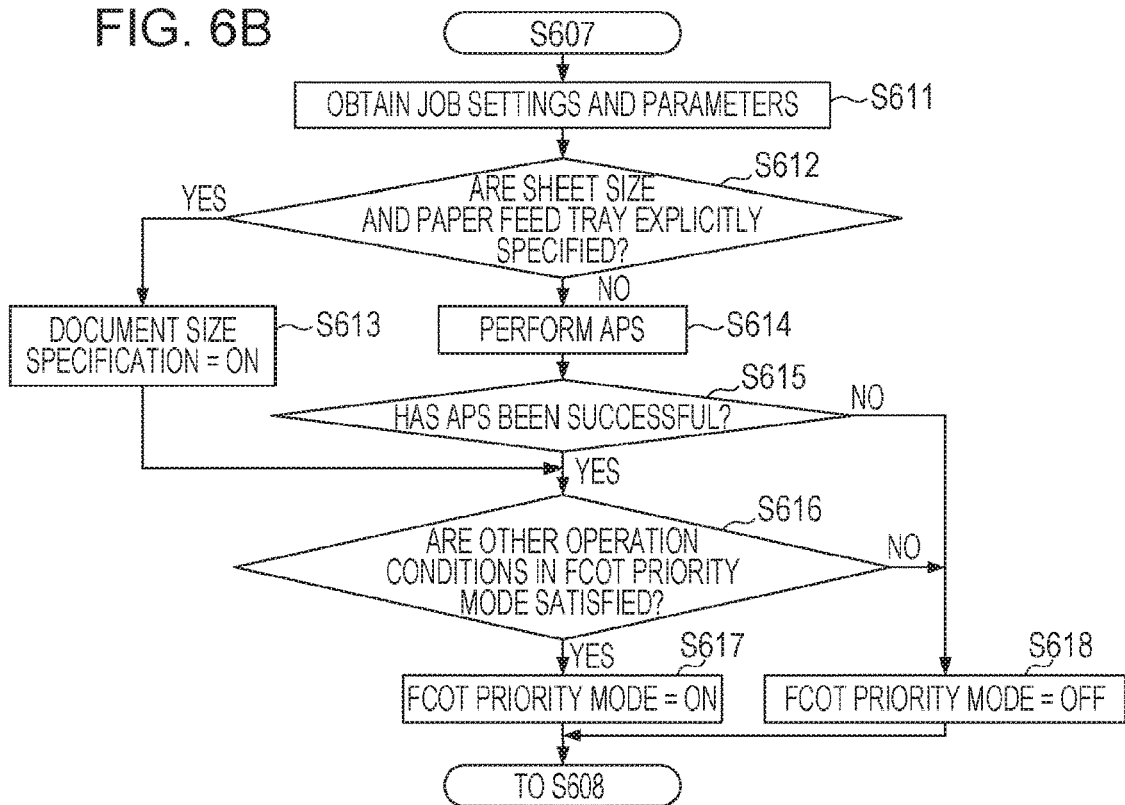

Next, determination of a copying process mode will be described. FIG. 6B is a flowchart illustrating control for determining whether to operate in the FCOT priority mode.

In step S611, the CPU 111 obtains job settings and parameters. In step S612, the CPU 111 determines whether a sheet size and a paper feed tray are explicitly specified on the basis of the job setting information obtained in step S611. It is to be noted that if the user selects a print sheet (sheet) using the operation key 914, the sheet size and the paper feed tray to be used for printing are explicitly set for the job. If determining that the sheet size and the paper feed tray are specified, the CPU 111 proceeds to step S613 and sets a document size specification flag to ON as a job parameter. If determining that the sheet size and the paper feed tray are not explicitly specified, the CPU 111 proceeds to step S614.

In step S614, the CPU 111 performs automatic paper feed cassette selection (APS: Auto Paper Select) on the basis of the size of the document obtained in step S603 or step S605. The CPU 111 sets information regarding a paper feed cassette selected as a result of the APS as a job parameter. It is to be noted that the APS is a function of automatically selecting a paper feed cassette in accordance with the size of a document to be read and a specified scaling factor.

In step S615, the CPU 111 determines whether the APS has been successful. If a paper feed cassette can be selected as a result of the APS, the CPU 111 determines that the APS has been successful, and proceeds to step S616. On the other hand, if a paper feed cassette cannot be selected as a result of the APS, the CPU 111 determines that the APS has failed, and proceeds to step S618. In step S616, the CPU 111 determines whether other operation conditions for the FCOT priority mode are satisfied.

In the present embodiment, there are some conditions for the operation in the above-described FCOT priority mode.

FIG. 11 is a diagram illustrating an example of predetermined typical conditions for the operation in the FCOT priority mode.

A first condition is that, as indicated by items 1101, settings relating to the size of a document be made to satisfy conditions. As illustrated in FIG. 10B, in the FCOT priority mode, image data whose compression rate is low needs to be shared between the reading unit 118 and the printing unit 120, and larger memory than in the normal copy mode needs to be secured. The size of a document therefore needs to be determined before a starting of execution of a job.

In addition, in order to perform the reading and the printing in parallel with each other, a timing at which a sheet is fed from a paper feed tray, for example, needs to be advanced. Settings read during execution of a job, such as a paper feed cassette and a paper feed size, need to be made.

In addition, a document mixture mode is a mode in which documents of different sizes are read, and the sizes of the documents are detected by the second detection unit in the conveying path. If the document mixture mode is set to ON, therefore, the operation in the FCOT priority mode is not performed since sizes of documents cannot be determined before the starting of the execution of a job.

A next condition is that, as indicated by items 1102, processing applied to the entirety of a print page not be set. Settings such as scaling (enlargement or reduction) of an image, reduction layout, division reading, and image shifting, for example, are image processing performed on the entirety of image data. In addition, printing setting is a function of superimposing a character string or an image on read image data. In addition, because order of pages read by the reading unit 118 and order of pages to be printed are different from each other in bookbinding layout, a plurality of pieces of image data need to be temporarily accumulated in the storage or the like. If one of these function is set, the reading and printing of image data cannot be performed in parallel with each other, and the operation in the FCOT priority mode is not performed.

In addition, the color mode needs to be set to color or monochrome. If automatic selection is set as the color mode, the CPU 111 determines color pixels on the basis of color components (R, G, and B luminance signals) of each pixel of a read document image and determines the color mode for performing the printing. If automatic selection is set, therefore, the operation in the FCOT priority mode is not performed because the reading and printing of image data cannot be performed in parallel with each other.

A last condition is that, as indicated by an item 1103, duplex printing not be set. In the present embodiment, when a sheet is fed to the printing unit 120, the CPU 111 sets control information regarding a page to be printed on the sheet. If duplex copying is set, the operation in the FCOT priority mode is not performed because priority is given to time taken to output sheets corresponding to one copy. More specifically, in the duplex copying in the present embodiment, a back surface of the same sheet is reversed in the reversal path while printing is performed on a front surface of a next sheet, that is, distances between sheets passing along the conveying path are shortened during printing, in order to reduce copying time. The operation in the FCOT priority mode is therefore not performed.

It is to be noted that the conditions illustrated in FIG. 11 are an example of typical conditions in the present embodiment, and aspects of the present invention are not limited to these.

Returning to the description of FIG. 6B, in step S616, if determining the operation conditions for the FCOT priority mode are satisfied, the CPU 111 proceeds to step S617 and sets the FCOT priority mode to ON. On the other hand, if determining that the operation conditions for the FCOT priority mode are not satisfied, the CPU 111 proceeds to step S618 and sets the FCOT priority mode to OFF.

Copying Process

Figure 7A:
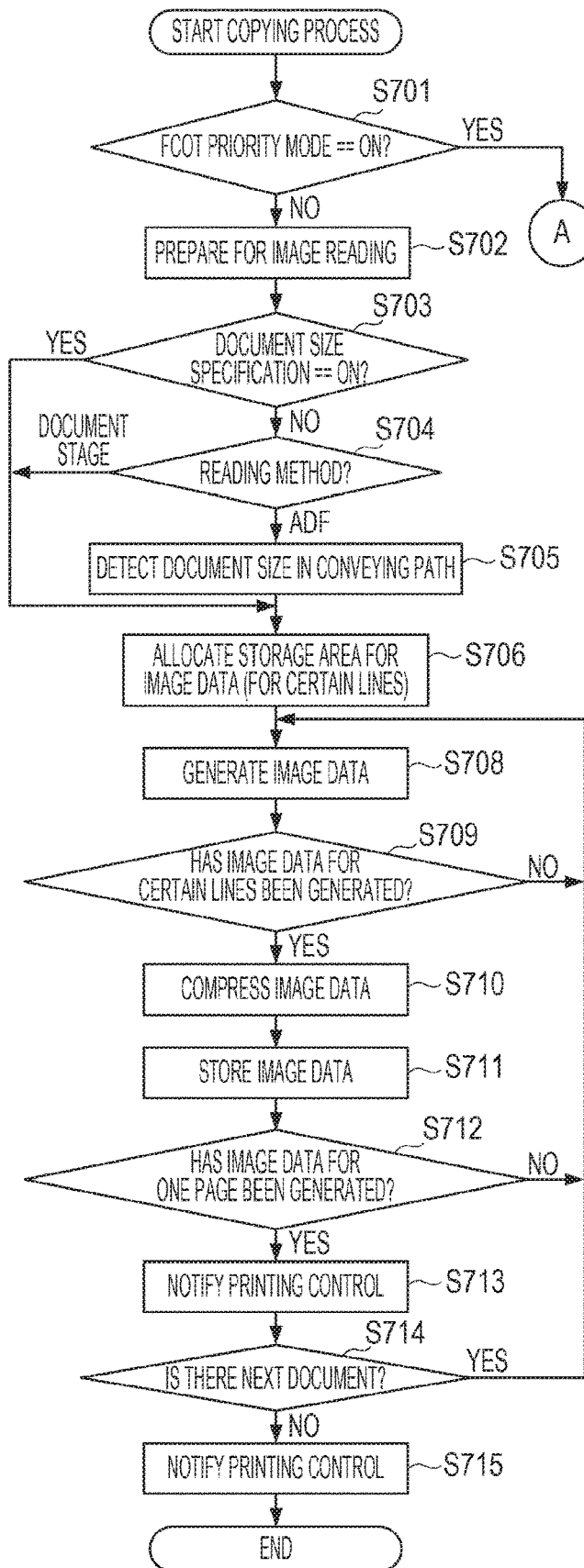
FIGS. 7A and 7B are flowcharts illustrating a control method for controlling execution of copying.
Figure 7B:
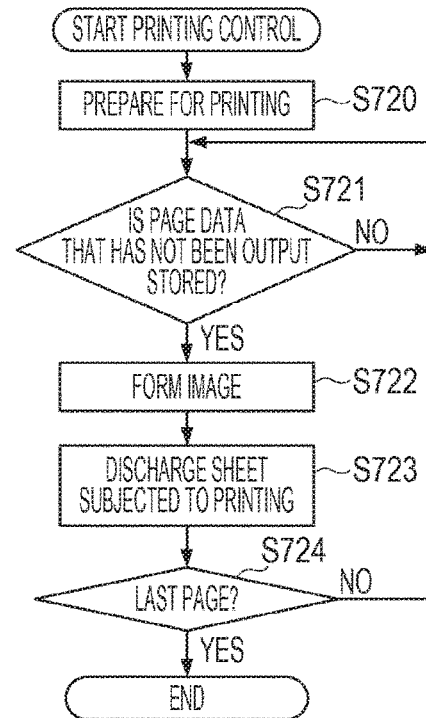

Next, the copying process will be described with reference to the flowcharts of FIGS. 7 and 8. FIGS. 7(A) and 8(A) are flowcharts regarding image reading control and flowcharts illustrating the operation of a first program according to the present embodiment. In addition, FIG. 7B is a flowchart regarding printing control in the normal copy mode and a flowchart illustrating the operation of a second program according to the present embodiment. FIG. 8B is a flowchart regarding printing control in the FCOT priority mode and a flowchart illustrating the operation of a fourth program according to the present embodiment. Furthermore, FIG. 8C is a flowchart regarding erroneous detection control in the FCOT priority mode and a flowchart illustrating the operation of a third program according to the present embodiment.

In the present embodiment, the first program, which performs the image reading control, the third program, which performs control for determining erroneous detection, and the second and fourth programs, which perform the printing control, cooperate to realize the copying process. If determining that the start key has been pressed (YES in step S608), the CPU 111 starts to execute the first program corresponding to the flowcharts of FIGS. 7(A) and 8(A).

First, a case in which the FCOT priority mode is OFF, that is, a case of the operation in the normal copy mode, will be described. In the normal copy mode, after the reading control stores an image in the storage 114, the printing control performs printing.

In step S701, the CPU 111 determines whether the FCOT priority mode is ON. If determining that the FCOT priority mode is ON, the CPU 111 proceeds to the flowchart of FIG. 8A and performs copying in the FCOT priority mode. On the other hand, if determining that the FCOT priority mode is OFF, the CPU 111 proceeds to step S702.

In step S702, the CPU 111 controls the reading unit 118 and the image processing section 125 on the basis of job settings and job parameters to prepare for reading of a document. If the method in which a document is read from the ADF is set as a job parameter, for example, the CPU 111 starts to feed a document and moves the optical unit 202a to the front surface reading position. On the other hand, if the method in which a document is read from the document stage is set as a job parameter, for example, the CPU 111 moves the optical unit 202a to a position at which the optical unit 202a can read a document set on the document stage glass 203.

In step S703, the CPU 111 determines whether the document size specification flag is ON. If determining that the document size specification flag is ON, the CPU 111 proceeds to step S706. If determining that the document size specification flag is OFF, the CPU 111 proceeds to step S704.

In step S704, the CPU 111 determines, on the basis of a job parameter, whether to read a document set on the ADF 126 or a document set on the glass 203. If the method in which a document set on the ADF 126 is read is set as a job parameter, the CPU 111 proceeds to step S705. On the other hand, if the method in which a document set on the document stage glass 203 is read is set as a job parameter, the CPU 111 proceeds to step S706.

In step S705, the CPU 111 detects the size of the document to be read in the conveying path using the second detection unit. The ADF 126, for example, obtains the number of driving clocks measured until the sensor 15 is turned off after the sensor 15 senses a leading edge of the document and turns ON. The ADF 126 multiplies the obtained number of driving clocks by the amount of movement of the document achieved by the rollers per driving clock to calculate the document length of the document that is being conveyed. In addition, the ADF 126 can detect the document width of the document that is being conveyed using the document width detection sensor (not illustrated) provided along the conveying path. The CPU 111 detects the size of the document in the conveying path on the basis of the document length and the document width detected by the ADF 126.

In step S706, a storage area for storing image data for certain lines is secured in the RAM 113 on the basis of the copy job settings and parameters.

In step S708, the reading unit 118 reads the document and generates image data. In step S709, the CPU 111 determines whether the image data for certain lines has been generated. If determining that the image data for certain lines has been generated, the CPU 111 proceeds to step S710. If determining that the image data for certain lines has not been generated, the CPU 111 returns to step S708. In step S710, the compression/expansion section 124 codes and compresses the image data for certain lines read by the reading unit 118. In step S711, the compression/expansion section 124 stores the image data for certain lines compressed in step S710 in the image storage area of the storage 114.

In step S712, the CPU 111 determines whether image data for one page has been generated. If determining that image data for one page has been generated, the CPU 111 proceeds to step S713. On the other hand, if determining that image data for one page has not been generated, the CPU 111 returns to step S708 and obtains the image data by repeating step S708 to step S711.

In step S713, the CPU 111 notifies the second program, which relates to the printing control, that image data for one page has been generated. In addition, if the image data is a first page, the CPU 111 transmits, to the second program, which relates to the printing control, information indicating that the printing control is to start. It is to be noted that if page integration or the like is set as a job setting, image data for a plurality of pages might be necessary to form an image on a sheet. In this case, information indicating that the printing control is to start may be issued after all pieces of image data for a plurality of pages to be printed on a sheet are obtained.

In step S714, the CPU 111 determines whether there is a next document. If reading a document set on the ADF 126, the CPU 111 determines whether a document is set on the ADF 126 on the basis of the output value of the sensor 14. If the output value of the sensor 14 is ON, the CPU 111 determines that there is a next document, and returns to step S708. On the other hand, if the output value of the sensor 14 is OFF, the CPU 111 determines that there is not a next sheet, and proceeds to step S715. In addition, if reading a document set on the glass 203 on the basis of job parameters, the CPU 111 determines that there is not a next document, and proceeds to step S715.

In step S715, the CPU 111 notifies the second program that reading of a document corresponding to a last page has ended, and ends the image reading control. In addition, if reading a document set on the glass 203, the CPU 111 determines that there is not a next document. The CPU 111 then notifies the second program that the reading of the document has ended, and ends the image reading control.

Next, printing control during the operation in the normal copy mode will be described. The flowchart of FIG. 7B illustrates the operation of the second program, which relates to the printing control in the normal copy mode. After receiving, from the first program, which relates to the reading control, a notification indicating that the printing control is to start, the second program starts to perform control. When image data used for performing printing on a first sheet has been generated, the first program issues the notification indicating that the printing control is to start (step S713).

In step S720, the CPU 111 controls the printing unit 120 to prepare for the printing by, for example, starting up the drums and warming up the fuser. In addition, the CPU 111 notifies, on the basis of the copy job settings and parameters, the printing unit 120 of the size of a sheet to be fed and whether to perform image formation in colors or monochrome. After completing the preparation for the printing, the CPU 111 proceeds to step S721.

In step S721, the CPU 111 determines whether page data (image data for one page) that has not been output is stored in the image storage area of the storage 114. If determining that page data that has not been output is stored, the CPU 111 proceeds to step S721. On the other hand, if determining that page data that has not been output is not stored, the CPU 111 waits until page data that has not been output is generated. It is to be noted that, after receiving, from the first program, a notification indicating that image data for one page has been generated, the CPU 111 determines that page data that has not been output is newly stored in the storage area.

In step S722, the CPU 111 controls the printing unit 120 to perform image formation. More specifically, the CPU 111 loads compressed image data from the image storage area and, after expanding the compressed image data, performs image processing in accordance with printing settings and the like. The CPU 111 transfers the image data subjected to the image processing to the printing unit 120. The printing unit 120 feeds a sheet used for the printing from a paper feed tray and forms an image on the sheet by performing the above-described processes such as exposure, developing, transfer, and fusing.

In step S723, the printing unit 120 discharges the sheet subjected to the printing to the discharge tray 247. It is to be noted that the post-processing or the like is performed on a plurality of sheets on the basis of the copy settings, the document is temporarily stacked on the stack tray 245. In this case, the post-processing is performed on the sheets after a last sheet is subjected to the printing, and the sheets are discharged to the discharge tray 247.

In step S724, if determining that the notification (the notification in step S715) indicating that the reading of the document corresponding to the last page has ended has been received from the first program and that the printing of the page has been completed, the CPU 111 ends the printing control. On the other hand, if the notification indicating that the reading of the document corresponding to the last page has ended has not been received from the first program, the CPU 111 returns to step S721 and performs image formation for a next page and later.

It is to be noted that, in the normal copy mode, the printing control illustrated in FIG. 7B may be performed after the reading of all documents is completed, instead, depending on the copy job settings. If duplex printing is set as a copy job, for example, image data for a plurality of pages needs to be accumulated since the same sheet is reversed while printing is being performed on a front surface of a next sheet. The CPU 111 therefore performs the printing control illustrated in FIG. 7B after reading all the documents.

As described above, in the normal copy mode, printing is performed after a document corresponding to at least one page is read.

Next, a case in which the FCOT priority mode is ON, that is, a case of the operation in the FCOT priority mode, will be described. In the FCOT priority mode, the FCOT is reduced by starting to transfer image data for one page to the printing unit 120 and starting the printing process before the reading unit 118 finishes reading the image data. In the FCOT priority mode, the size of a document needs to be detected on the document setting unit 201 in order to advance a preparation operation for transferring image data to the printing unit 120.

First, the operation of the first program, which relates to the image reading control, will be described. In step S701, if determining that the FCOT priority operation is ON, the CPU 111 proceeds to the flowchart of FIG. 8A.

In step S800, the CPU 111 allocates an image data storage area in the RAM 113 on the basis of job settings and parameters. It is to be noted that, in the FCOT priority mode, a storage area into which image data for at least one page can be loaded is secured in order to forward image data read by the reading unit 118 to the printing unit 120 through the storage area in the RAM 113.

In step S801, the CPU 111 controls the compression/expansion section 124, the image processing section 125, the reading unit 118, and the like on the basis of the copy job settings and parameters to prepare for reading of a document. If the method in which a document is read from the ADF is set as a job parameter, for example, the CPU 111 starts to feed a document and moves the optical unit 202a to the front surface reading position. On the other hand, if the method in which a document is read from the document stage is set as a job parameter, for example, the CPU 111 moves the optical unit 202a to the position at which the optical unit 202a can read a document set on the document stage glass 203.

In step S802, the CPU 111 determines whether the document size specification flag is ON. If determining that the document size specification flag is ON, the CPU 111 proceeds to step S805. If determining that the document size specification flag is OFF, the CPU 111 proceeds to step S803.

In step S803, the CPU 111 determines, on the basis of a job parameter, whether to read a document set on the ADF 126 or a document set on the glass 203. If the method in which a document set on the ADF 126 is read is set as a job parameter, the CPU 111 proceeds to step S804. On the other hand, if the method in which a document set on the document stage glass 203 is read is set as a job parameter, the CPU 111 proceeds to step S805.

In step S804, the CPU 111 notifies the third program, which relates to the control for determining erroneous detection of the size of a document, that the control is to start. In addition, the CPU notifies the third program of the size of the document detected on the document setting unit 201. The control for determining erroneous detection of the size of a document will be described with reference to the flowchart of FIG. 8C.

In step S805, the CPU 111 notifies the fourth program, which relates to the printing control in the FCOT priority mode, that the control is to start. In step S806, the CPU 111 notifies the fourth program, which relates to the printing control, of an address of the storage area secured in step S800.

In step S807, the CPU 111 controls the reading unit 118 to read image data on the document. The read image data is transferred to the storage area in the RAM 113. It is to be noted that speed at which the reading unit 118 reads image data is appropriately controlled such that the speed does not become lower than speed at which the printing unit 120 reads image data.

In step S808, the CPU 111 determines whether image data of a certain size or larger has been stored in the storage area. If determining that image data of a certain size or larger has been stored in the storage area, the CPU 111 proceeds to step S810. On the other hand, if determining that image data of a certain size has not been stored in the storage area, the CPU 111 proceeds to step S812.

In step S810, the CPU 111 determines whether the fourth program, which relates to the printing control, has been notified that the image data of a certain size or larger corresponding to the document that is being read has been stored. If the notification has not been issued, the CPU 111 proceeds to step S811. If the notification has been issued, the CPU 111 skips step S811 and proceeds to step S812.

In step S811, the CPU 111 notifies the fourth program, which relates to the printing control, that the image data of a certain size or larger has been generated. It is to be noted that the notification in step S811 is used in the fourth program as a trigger to start to transfer the image data to the printing unit 120.

In step S812, the CPU 111 determines whether image data for one page has been generated. If determining that image data for one page has been generated, the CPU 111 proceeds to step S813. If determining that image data for one page has not been generated, the CPU 111 returns to step S807 and continues to read the document. In step S813, the CPU 111 notifies the fourth program that image data for one page has been generated.

In step S814, the CPU 111 determines whether the third program, which relates to the erroneous detection determination, has transmitted a notification of erroneous detection of the size. If determining that the third program has transmitted a notification of erroneous detection of the size, the CPU 111 proceeds to step S815. If determining that the third program has not transmitted a notification of erroneous detection of the size, the CPU 111 proceeds to step S816.

In step S815, the CPU 111 controls the reading unit 118 to stop the reading control. It is to be noted that although reading of a next page and later is stopped after reading and printing of a page in which erroneous detection has occurred are completed if erroneous detection of the size occurs in the present embodiment, aspects of the present invention are not limited to this. The reading of the page, for example, may be stopped halfway, and image data that has already been read may be printed on a sheet, instead. In this case, the first program discharges a document that is being conveyed and ends the reading control.

In step S816, the CPU 111 determines whether there is a next document. If reading a document set on the ADF 126 and detecting a document set on the ADF 126 on the basis of the output value of the sensor 14, the CPU 111 determines that there is a next document, and returns to step S807. On the other hand, if determining that a document is not set on the ADF 126 on the basis of the output value of the sensor 14, the CPU 111 determines that there is not a next document, and proceeds to step S817. In step S817, the CPU 111 notifies the fourth program that reading of a document corresponding to a last page has ended, and ends the image reading control. In addition, if reading a document set on the glass 203, the CPU 111 determines that there is not a next document. The CPU 111 then notifies the fourth program that the reading of the document has ended, and ends the image reading control.

Next, the erroneous detection control during the operation in the FCOT priority mode will be described. The flowchart of FIG. 8C illustrates the operation of the third program, which relates to the erroneous detection control. After receiving, from the first program, which relates to the reading control, the notification (the notification in step S804) indicating that the erroneous detection determination is to start, the third program starts to perform control for determining erroneous detection of the size of a document. In step S841, as in step S705, the CPU 111 detects the size of the document to be read in the conveying path using the second detection unit.

In step S842, if determining that the size of the document detected by the first detection unit is different from the size of the document detected in step S841, the CPU 111 proceeds to step S843. On the other hand, if determining that the detected sizes of the documents are the same, the CPU 111 proceeds to step S847.

In step S847, the CPU 111 determines whether the notification (the notification in step S817) indicating that the reading of the document corresponding to the last page has ended has been received from the first program. If determining that the notification indicating that the reading of the document corresponding to the last page has ended has been received, the CPU 111 ends the control for determining erroneous detection. On the other hand, if determining that the notification indicating that the reading of the document corresponding to the last page has ended has not been received, the CPU 111 returns to step S841.

In step S843, the CPU 111 notifies the first program, which relates to the reading control, and the fourth program, which relates to the printing control in the FCOT priority mode, that the size of the document detected on the document setting unit has been erroneously detected. It is to be noted that upon receiving the notification, the first program and the fourth program perform a process for stopping the copy job.

Figure 12:
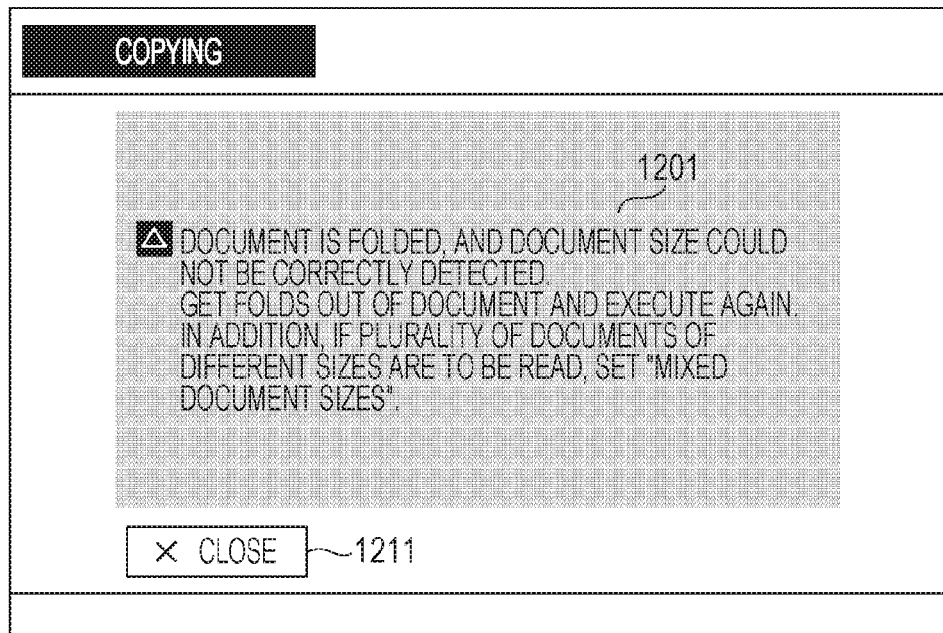
FIG. 12 is a diagram illustrating an operation screen displayed on the operation unit 116.

In step S844, the CPU 111 controls the operation unit 116 to display a notification screen for notifying the user of the erroneous detection of the size of the document. FIG. 12 is a diagram illustrating an example of the notification screen. Information 1201 is information for notifying the user that the size of the document has not been correctly detected. An operation key 1211 is an operation key used for closing the notification screen.

Returning to the description of FIG. 8C, in step S845, the CPU 111 determines whether the key 1211 has been pressed. If the key 1211 has not been pressed, the CPU 111 returns to step S845 and waits until the user presses the key 1211. If the key 1211 has been pressed, the CPU 111 proceeds to step S846. In step S846, the CPU 111 closes the notification screen and ends the copying process.

As described above, if erroneous detection of the size of a document occurs in the FCOT priority mode, the user can be notified of the erroneous detection. It is to be noted that if erroneous detection of the size of a document occurs, the counter information relating to charging stored in the storage 114 need not be updated.

Finally, the printing control during the operation in the FCOT priority mode will be described. The flowchart of FIG. 8B illustrates the operation of the fourth program, which relates to the printing control in the FCOT priority mode. After receiving, from the first program, which relates to the reading control, the notification (the notification in step S805) indicating that the printing control is to start, the fourth program starts the control.

In step S820, the CPU 111 controls the printing unit 120 to prepare for the printing by, for example, starting up the drums and warming up the fuser. In addition, the CPU 111 notifies, on the basis of the copy job settings and parameters, the printing unit 120 of the size of a sheet to be fed and whether to perform image formation in colors or monochrome. After completing the preparation for the printing, the CPU 111 proceeds to step S821.

In step S821, the CPU 111 shares the storage area transmitted from the first program, which relates to the reading control, with the first program on the basis of the address (the notification in step S806) of the storage area.

In step S822, if receiving the notification (the notification in step S811) indicating that image data of a certain size or larger has been generated has been received from the first program, the CPU 111 proceeds to step S824. On the other hand, if the notification indicating that image data of a certain size or larger has been generated has not been received, the CPU 111 waits until a notification indicating that image data of a certain size or larger has been generated is received from the second program.

In step S824, the CPU 111 reads the image data of a certain size or larger from the storage area and transfers the image data to the printing unit 120. In step S825, the CPU 111 controls the printing unit 120 to feed a sheet to be subjected to printing and performs the above-described processes such as exposure, developing, transfer, and fusing on the basis of the transferred image data.

In step S826, if determining, on the basis of the notification (the notification in step S813) indicating that image data for one page has been generated from the first program, that image formation corresponding to the image data has been completed, the CPU 111 proceeds to step S827. On the other hand, if the CPU 111 has not received, from the first program, the notification indicating that image data for one page has been generated, the CPU 111 returns to step S824 and performs image formation.

In step S827, the CPU 111 determines whether a notification of erroneous detection of the size has been received from the third program, which relates to the erroneous detection determination. If determining that the notification of erroneous detection of the size has been received, the CPU 111 proceeds to step S828. If determining that the notification indicating that erroneous detection of the size has not been received, the CPU 111 proceeds to step S829. In step S828, the CPU 111 controls the printing unit 120 to stop the image formation process. It is to be noted that although reading of a next page and later is stopped after reading and printing of a page in which erroneous detection has occurred are completed if erroneous detection of the size occurs in the present embodiment, aspects of the present invention are not limited to this. The image formation, for example, may be stopped after a notification of erroneous detection is received, and the sheet may be output, instead. In this case, if a notification of erroneous detection is received before the image formation in step S825, a blank sheet is output. In addition, if the CPU 111 receives a notification of erroneous detection after the image formation in step S825 starts, a sheet in which an image is partly formed is output.

In step S829, if determining that the notification (the notification in step S817) indicating that the reading of the document has ended has been received from the first program and the printing of the image data corresponding to the last page has been completed, the CPU 111 ends the printing control. On the other hand, if the CPU 111 has not received, from the first program, the notification indicating that the reading of the document has ended, the CPU 111 returns to step S822 and performs image formation on a next sheet.

As described above, in the present embodiment, the method for detecting the size of a document is automatically selected both when the operation for reducing the FCOT is performed and when the operation for reducing the FCOT is not performed. If the operation for reducing the FCOT is performed, the size of a document detected by the first detection unit before conveying of the document starts is used, and the copying process can be performed in the FCOT priority mode. On the other hand, if the operation for reducing the FCOT is not performed, since the copying process is performed using the size of a document determined by the second detection unit after conveying of the document starts, the copying process can be performed using the correct document size.

Furthermore, in the present embodiment, if the copying process is performed in the FCOT priority mode, the user can be notified that erroneous detection of the size of a document has occurred. It is therefore possible to suppress output without the user knowing that part of the actual document is missing.

In addition, in the present embodiment, if erroneous detection of the size of a document occurs in the FCOT priority mode, the counter information relating to charging stored in the storage 114 need not be updated. It is therefore possible to suppress charging after a copying process in which part of the document is missing due to erroneous detection in the MFP occurs.

Other Embodiments

Aspects of the present invention can also be realized by a process in which a program that realizes one or more functions according to the above embodiment is supplied to a system or an apparatus through a network or a storage medium and one or more processors in a computer of the system or the apparatus read and execute the program. In addition, aspects of the present invention can be realized by a circuit (e.g., an ASIC) that realizes the one or more functions.

Although exemplary embodiments have been described in detail, aspects of the present invention are not limited to such particular embodiments and may be modified and altered in various ways without deviating from the scope thereof described in the claims.

According to aspects of the present invention, if an operation for reducing the FCOT is performed by dynamically selecting the method for detecting the size of a document in accordance with the conditions, the time taken until a first sheet can be reduced. If the operation for reducing the FCOT is not performed, it is possible to prevent part of an image from missing.

While aspects of the present invention have been described with reference to exemplary embodiments, it is to be understood that the aspects of the invention is not limited to the disclosed exemplary embodiments. The scope of the following claims is to be accorded the broadest interpretation so as to encompass all such modifications and equivalent structures and functions.

The invention claimed is:

1. A copier comprising a conveyor for conveying a document set on a document setting tray, a reader which is able to read an image on the document conveyed by the conveyor to generate image data, and a printer for printing the image based on the image data, the copier comprising:
   at least one first sensor that detects information regarding the document set on the document setting tray;
   at least one second sensor that detects, after the conveyor starts to convey the document, information regarding the conveyed document; and
   a display that displays error information based on a first document size determined from the information detected by the at least one first sensor and a second document size determined from the information detected by the at least one second sensor.

2. The copier according to claim 1, wherein
   the display displays the error information in a case where the first document size determined from the information detected by the at least one first sensor is not same as the second document size determined from the information detected by the at least one second sensor.

3. The copier according to claim 1, wherein the error information is for notifying a user that the document is folded.

4. The copier according to claim 1, wherein the error information is for urging a user to get folds out of the document.

5. The copier according to claim 1, wherein the error information is for urging a user to get folds out of the document.

6. The copier according to claim 1, wherein the display further displays a message for urging a user to set a mixed document sizes mode.

7. A method for controlling a copier comprising a conveyor for conveying a document set on a document setting tray, a reader which is able to read an image on the document conveyed by the conveyor to generate image data, and a printer for printing the image based on the image data, the method comprising:
   detecting, by at least one first sensor, information regarding the document set on the document setting tray; and
   detecting, by at least one second sensor after the conveyor starts to convey the document, information regarding the conveyed document; and
   displaying error information based on a first document size determined from the information detected by the at least one first sensor and a second document size determined from the information detected by the at least one second sensor.

8. A non-transitory computer readable storage medium for storing a computer program for controlling a copier comprising a conveyor for conveying a document set on a document setting tray, a reader which is able to read an image on the document conveyed by the conveyor to generate image data, and a printer for printing the image based on the image data, the computer program comprising:
   a code to detect, by at least one first sensor, information regarding the document set on the document setting tray; and
   a code to detect, by at least one second sensor after the conveyor starts to convey the document, information regarding the conveyed document; and
   a code to cause a display to display error information based on a first document size determined from the information detected by the at least one first sensor and a second document size determined from the information detected by the at least one second sensor.

9. A copier comprising a conveyor for conveying, via a conveying path, a document set on a document setting tray, a reader which is able to read an image on the document conveyed by the conveyor to generate image data, and a printer for printing the image based on the image data, the copier comprising:

at least one first sensor on the document setting tray;
at least one second sensor in the conveying path; and
a display that displays error information based on a first document size determined based on output from the at least one first sensor and a second document size determined based on output from the at least one second sensor.

10. The copier according to claim 9, wherein
the display displays the error information in a case where the first document size determined based on output from the at least one first sensor is not the second document size determined based on output from the at least one second sensor.

11. The copier according to claim 9, wherein the error information is for notifying a user that the document is folded.

12. The copier according to claim 9, wherein the error information is for urging a user to get folds out of the document.

13. The copier according to claim 9, wherein the error information is for urging a user to get folds out of the document.

14. The copier according to claim 9, wherein the display further displays a message for urging a user to set a mixed document sizes mode.

15. A copier comprising a conveyor for conveying, via a conveying path, a document set on a document setting tray, a reader which is able to read an image on the document conveyed by the conveyor to generate image data, and a printer for printing the image based on the image data, wherein the copier performs a copy job using the reader and the printer, the copier comprising:

at least one first sensor on the document setting tray;
at least one second sensor in the conveying path; and
a controller that interrupts the copy job based on a first document size determined based on output from the at least one first sensor and a second document size determined based on output from the at least one second sensor.

16. The copier according to claim 15, wherein
the controller interrupts the copy job in a case where the first document size determined based on output from the at least one first sensor is not the second document size determined based on output from the at least one second sensor.

17. The copier according to claim 15, further comprising a display that displays error information based on the first document size determined based on output from the at least one first sensor and the second document size determined based on output from the at least one second sensor.

18. The copier according to claim 17, wherein the error information is for notifying a user that the document is folded.

19. The copier according to claim 17, wherein the error information is for urging a user to get folds out of the document.

20. The copier according to claim 17, wherein the error information is for urging a user to get folds out of the document.

* * * * *